(12) United States Patent
Finlow-Bates et al.

(10) Patent No.: US 9,940,944 B2
(45) Date of Patent: Apr. 10, 2018

(54) SMART MUTE FOR A COMMUNICATION DEVICE

(71) Applicant: QUALCOMM Incorporated, San Diego, CA (US)

(72) Inventors: Keir Finlow-Bates, Kangasala (FI); Koushik Annapureddy, Tampere (FI)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 14/462,898

(22) Filed: Aug. 19, 2014

(65) Prior Publication Data

US 2016/0055859 A1    Feb. 25, 2016

(51) Int. Cl.
| G10L 21/00 | (2013.01) |
| G10L 21/02 | (2013.01) |
| G10L 25/90 | (2013.01) |
| H04M 1/60 | (2006.01) |
| H04M 1/656 | (2006.01) |
| H04M 3/42 | (2006.01) |

(52) U.S. Cl.
CPC .......... *G10L 21/0202* (2013.01); *G10L 25/90* (2013.01); *H04M 1/6008* (2013.01); *H04M 1/656* (2013.01); *H04M 3/42221* (2013.01); *H04M 2201/36* (2013.01); *H04M 2203/30* (2013.01); *H04M 2250/62* (2013.01)

(58) Field of Classification Search
CPC .................................................. G10L 21/0202
See application file for complete search history.

(56) References Cited

U.S. PATENT DOCUMENTS

| 7,085,558 | B2 | 8/2006 | Berstis et al. |
| 8,209,181 | B2 | 6/2012 | Heckerman et al. |
| 8,406,390 | B1 | 3/2013 | Halferty et al. |
| 8,467,524 | B1 | 6/2013 | Lee et al. |
| 8,553,067 | B2 | 10/2013 | Shaffer et al. |
| 8,743,743 | B1 * | 6/2014 | Mai ........................ H04M 3/566 370/260 |

(Continued)

OTHER PUBLICATIONS

International Search Report and Written Opinion—PCT/US2015/042167—ISA/EPO—dated Sep. 25, 2015.

(Continued)

*Primary Examiner* — Richa Mishra
(74) *Attorney, Agent, or Firm* — The Marbury Law Group

(57) ABSTRACT

Methods, systems, and devices enable recovery of words spoken while a communication device is on mute during a voice call. A processor of the communication device or a network server may buffer audio segment in memory when the mute function is turned on. If the mute function is turned off soon after the input audio segment begins, or the processor recognizes from the spoken words that the speaker does not intend to be on mute, the processor may transmit to the third party participant a playback of at least one portion of the buffer in conjunction with turning off the mute function. Playback of the buffered audio segment may be sped up so that the playback catches up to current speech of the speaker. Buffering and playback of an input audio segment may be accomplished at the speaker's communication device or in a server within the communication network.

25 Claims, 10 Drawing Sheets

(56) References Cited

U.S. PATENT DOCUMENTS

| | | | |
|---|---|---|---|
| 2005/0147033 A1* | 7/2005 | Chin | H04N 21/2343 370/229 |
| 2006/0120624 A1* | 6/2006 | Jojic | G06F 17/30843 382/284 |
| 2008/0167868 A1* | 7/2008 | Kanevsky | G10L 15/20 704/233 |
| 2011/0267419 A1* | 11/2011 | Quinn | H04N 7/15 348/14.08 |
| 2013/0051543 A1* | 2/2013 | McDysan | H04M 3/4286 379/202.01 |
| 2013/0321156 A1 | 12/2013 | Liu | |
| 2014/0168135 A1* | 6/2014 | Saukko | G06F 1/1684 345/174 |
| 2014/0379351 A1* | 12/2014 | Raniwala | G06K 9/00335 704/270 |
| 2015/0012270 A1* | 1/2015 | Reynolds | G10L 25/84 704/233 |
| 2015/0085064 A1 | 3/2015 | Sanaullah et al. | |
| 2015/0195411 A1* | 7/2015 | Krack | H04M 3/569 379/202.01 |
| 2015/0304493 A1* | 10/2015 | Deluca | H04M 1/72519 379/207.04 |

OTHER PUBLICATIONS

Junuzovic S., et al., "What did I miss? In-Meeting Review using Multimodal Accelerated Instant Replay (AIR) Conferencing," ACM Conference on Computer-Human Interaction, 2011, 10 pages.

* cited by examiner

SMART MUTE FOR A COMMUNICATION DEVICE

BACKGROUND

The mute function on communication devices enables users to control when sounds are transmitted on an active voice call. By activating a mute function, a participant to an active voice call may ensure their communication device does not capture ambient sounds and does not transmit sounds to the other call participant(s). Often a participant will forget when he/she has the mute function on and start speaking to the other participant(s). The other participant(s) will not hear the muted speech and may not realize that this has happened except that they will not hear anything. When the muting party eventually realizes that the muted speech was not heard, he or she must repeat what was said.

SUMMARY

Various embodiments include methods, systems and devices for controlling voice call audio transmissions from a communication device to recover words spoken while on mute during an active voice call. In some embodiments, an input audio segment may be redirected to a buffer when a mute function is turned on that prevents the input audio segment from being output to other participants on the active voice call. A playback of at least one portion of the sound stored in the buffer may be transmitted to the third party participant in response to or conjunction with turning off the mute function. In various embodiments, the buffer may be an onboard memory of the communication device or in a server of the communication network connecting the call the third party participant. In various embodiments the input audio segment stored in the buffer may be modified to reduce its playback time, and the modified audio segment may be transmitted to the third party participant. The audio segment may be modified by removing periods of silence and/or speeding up the input audio segment while maintaining an original pitch of the input audio segment.

In various embodiments the input audio segment stored in the buffer may be analyzed to determine whether spoken words suggested that the speaker does not intend to be muted, in which case the user of the communication device may be prompted regarding whether to activate a smart un-mute feature. The smart un-mute feature may transmit to the third party participant the playback of at least one portion of the sound stored in the buffer in conjunction with turning off the mute function.

In further embodiments the communication device may analyze an image of the speaker, which may be obtained by a camera on the device, to determine whether the speaker is talking towards the device while the mute function is on. Using such image analysis a communication device processor may distinguish speech directed towards the device, implying that the speaker intended to be heard by the third party participant, from speech directed away from the device, implying that the speaker was talking to someone else and intended not to be heard by the third party participant. This may enable the processor to better recognize when the mute function has been left on unintentionally, and avoid turning off the mute function when the user is speaking to someone else nearby and intended to have the call on mute. The communication device processor may also direct the input audio stream to the buffer only when the speaker is looking at the device, thereby limiting the buffering and processing of an input audio stream to situations in which it is more likely that the mute function is on unintentionally.

Further embodiments may include a non-transitory processor-readable storage medium having stored thereon processor-executable instructions configured to cause a processor in a communication device to perform operations corresponding to the embodiment methods discussed above.

BRIEF DESCRIPTION OF THE DRAWINGS

The accompanying drawings are presented to aid in the description of embodiments of the disclosure and are provided solely for illustration of the embodiments and not limitation thereof.

DETAILED DESCRIPTION

Figure 1:
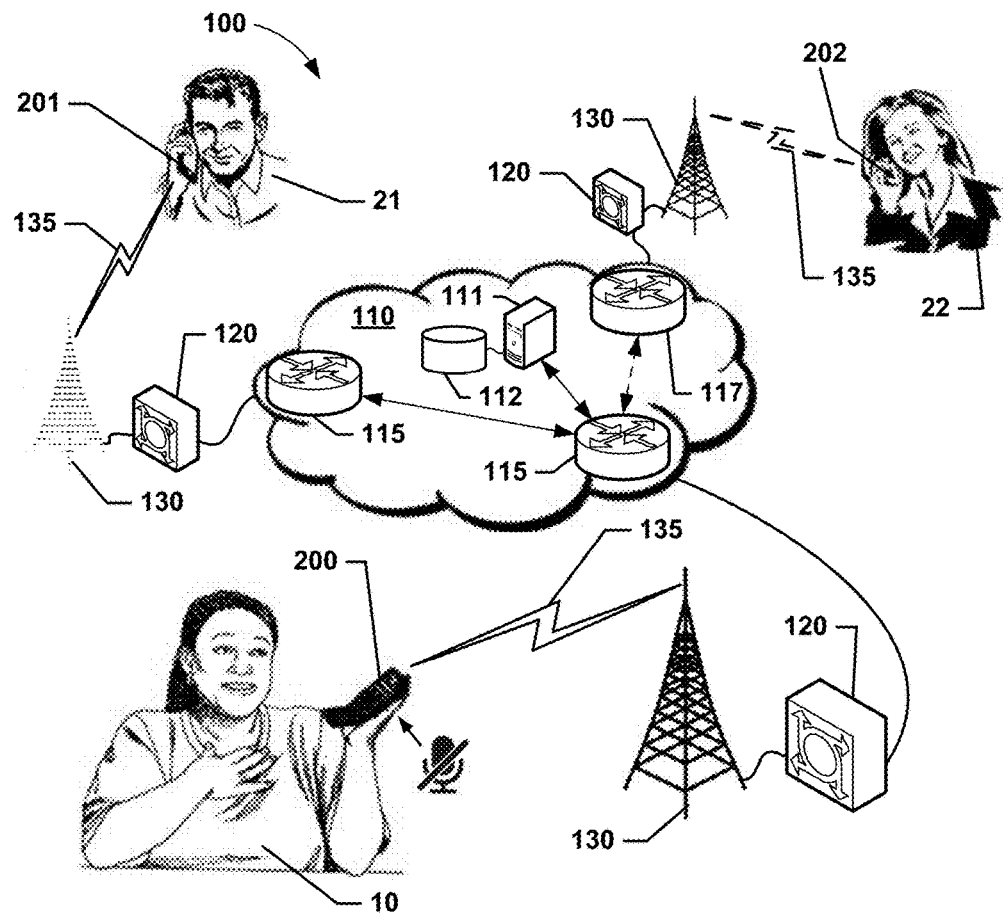
FIG. 1 is a communication system block diagram illustrating a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the disclosure or the claims. Alternate embodiments may be devised without departing from the scope of the disclosure. Additionally, well-known elements of the disclosure will not be described in detail or will be omitted so as not to obscure the relevant details of the disclosure.

The word "exemplary" is used herein to mean "serving as an example, instance, or illustration." Any implementation described herein as "exemplary" is not necessarily to be construed as preferred or advantageous over other implementations. Additionally, use of the words, "first," "second," "secondary," or similar verbiage is intended herein for clarity purposes to distinguish various described elements and is not intended to limit the invention to a particular order or hierarchy of elements.

The various embodiments provide methods that may be implemented in communication devices and communication systems for enabling inadvertently muted speech to be transmitted so that a user need not repeat what was said while unintentionally muted. In response to activation of a mute function of a communication, an onboard processor redirects an input audio segment received by a microphone of the communication device to a buffer. In this way, the received input audio segment may be saved for possible later use. In response to determining all or part of the muted speech should be played back from the buffer to a third party, a processor may initiate playback of all or part of the buffered input audio segment to a third party involved in the active voice call. The buffer may be maintained in the sending communication device (i.e., of the muting party), on a receiving communication device involved in the active voice call, or another network memory resource, such as a server involved in maintaining the communication link between the sending and receiving devices. The playback of all or part of the buffer may be initiated in response to deactivation of the mute function. Deactivation of the mute function may be accomplished in response to a user input (e.g., pressing an un-mute key or pressing the mute key a second time) or automatically upon recognizing that the buffer contains speech that is relevant to the voice call (versus background noise).

As used herein, the term "input audio segment" refers to sounds detected by a microphone and acted upon by a processor of a communication device. The microphone may be an onboard microphone of the communication device or a peripheral device connected to the processor using an intermediate connection, such as a wired or wireless connection.

As used herein, the term "buffer" refers to a temporary memory in which data is stored, particularly data associated with an input audio segment or one or more images including still and video images. Data stored in the buffer, such as a segment of an input audio stream, may be processed, transferred, or transmitted in accordance with various embodiments.

As used herein, the term "image" refers to an optical counterpart of an object captured by an image sensor. The optical counterpart may be light or other radiation from the object that is captured by an image sensor, such as reflected in a mirror or refracted through a lens.

As used herein, the term "image sensor" refers to a device that may use visible light (e.g., a camera) and/or other portions of the light spectrum, such as infrared, to capture images of objects in its field of view. The image sensor may include an array of sensors for linear, two-dimensional or three-dimensional image capture. Images captured by the image sensor, such as photographs or video, may be analyzed and/or stored directly in the wearable electronic device and/or transmitted elsewhere for analysis and/or storage.

In various embodiments, the input audio segment stored in the buffer while the communication device is on mute may be analyzed by a processor to recognize whether it contains speech, and if so whether the speech is relevant to the current voice call in order to determine automatically whether the mute function should be off. Such an analysis of the buffered input audio segment may use speech processing to recognize when the caller has resumed speaking with the mute function still on. A processor may automatically initiate a playback of the buffered input audio segment from a point at which the buffered sound includes speech determined to be relevant to the active voice call. In this manner, the otherwise unintentionally muted speech is not lost, and instead is played back to the receiving party. The processor may continue to store audio from the microphone in the buffer without directing that sound to the recipient while buffered speech is being played back to the receiving party, thereby buffering the real time audio input so that the user can continue to talk during the playback. The buffered speech (including the portions stored while mute was on and after the processor determined that mute should be turned off) will continue to be played back until the buffer is emptied, which occurs when playback catches up to real time (e.g., when the user pauses or stops talking). At that point the communication device will be fully off mute and communicating sound in real time.

In addition, the communication device processor may modify (e.g., compress or remove skip silent portions) the buffered input audio portions in order to more quickly catch up to the real time input audio stream. For example, pauses in speech or periods of silence greater than a few seconds (i.e., periods of silence) may be removed from the buffered input audio portions or skipped when transmitted during playback. In addition, the communication device processor may modify the buffered input audio by speeding it up. Further, a pitch of the buffered input audio may be maintained when speeding it up to avoid causing the playback to sound odd.

In some embodiments, the communication device processor may be configured with software to automatically detect when to turn off the mute function and initiate playback, such as by recognizing when the caller is speaking. In some embodiments, communication device may be configured with a smart un-mute user interface input (e.g., a virtual button or icon) to enable the caller to select when to playback a portion of the recorded audio to the other participants. Such a smart un-mute user interface may also enable the user to designate the duration or portion of the buffered audio to be played back.

In some embodiments, the communication device processor may be configured with software to use images of a user obtained from an image sensor in order to automatically determine whether the mute function should be maintained or turned off and playback initiated when the user is speaking by recognizing when the caller is speaking at or away from the communication device. In such embodiments, images of the user may be processed when speech is detected to determine whether the user has turned away from the device to speak to someone else, in which case the mute function should be maintained, or is looking at the communication device, in which case the smart un-mute function of the various embodiments should be implemented.

FIG. 1 illustrates a communication network 100 suitable for establishing and maintaining an active voice call in accordance with various embodiments. The active voice call includes a muting party 10, and two additional third parties 21, 22 involved in a conference call. The various embodiments are not limited to conference calls and may involve only two parties (e.g., 10, 21). The call participants 10, 21, 22 use communication devices 200, 201, 202 configured to establish wireless connections with cell towers or base stations 130 of one or more radio access networks in order to participate in the active voice call. For example, the communication devices 200, 201, 202 may transmit/receive audio segments using wireless signals 135 to base stations 130, which may be controlled by one or more base station controllers 120. Each communication device 200, 201, 202 includes a microphone for receiving local ambient noise, including speech, as an input audio segment. Also, each communication device 200, 201, 202 includes a receiver and speaker for generating an output audio segment for the active voice call. While the communication device 200 of the muting party 10 has a mute function on, the third parties 21, 22 do not hear ambient sounds from the communication device 200, such as any muted speech generated by the muted party 10.

The telecommunications network 110 may be a cellular data network, and may use channel access methods including, but not limited to, Frequency Division Multiple Access (FDMA), Time Division Multiple Access (TDMA), Code Division Multiple Access (CDMA), UMTS (particularly, Long Term Evolution (LTE)), Global System for Mobile Communications (GSM), Wi-Fi, PCS, 3G, 4G, or other protocols that may be used. The telecommunications network 110 may use the same or different wireless interfaces and/or physical layers. The telecommunications network 110 may include one or more servers 111, buffer 112, routers 115, 117, base stations 130, and base station controllers 120, as is known in the art. Alternate network configurations may also be used and the embodiments are not limited to the configuration illustrated. For example, in another embodiment the functionality of the base station controller 120 and at least one of the base stations 130 may be collapsed into a single "hybrid" module having the functionality of these components.

In various embodiments, the communication devices 200, 201, 202 may also establish connections with Wi-Fi access points, which may connect to the Internet. In addition, while various embodiments are particularly useful with wireless networks, the embodiments are not limited to wireless networks and may also be implemented over wired networks with no changes to the methods. For example, various embodiments may be implemented using traditional wired telephone network connections that are part of the public switched telephone network (PSTN), so fixed telephone lines, fiber optic cables, microwave transmission links, cellular networks, communications satellites, and undersea telephone cables may be used to establish connections between the communication devices 200, 201, 202.

The communication device 200 of the muting party 10 may have initiated the active voice call to at least one of the third parties 21, 22, such as to the communication device(s) 201, 202. Alternatively, the communication device 200 of the muting party 10 may have received the active voice call from one of the third parties 21, 22 using the communication device(s) 201, 202. Any one or all of the communication devices 200, 201, 202 may be any of a variety of devices, including, but not limited to, a mobile phone, laptop computer, PDA, server, etc.).

In some embodiments, when the mute function of the sending communication device is on, the muted input audio may be redirected to a buffer. When the mute function of the sending communication device is off, a playback may be initiated from the buffer of the muted input audio, or at least a portion thereof, for output on the receiving communication device. In addition, the playback of the muted input audio may be a modified version of the original, such as by omitting extended silence or speeding up the playback of that portion. In some embodiments, the mute function may be automatically turned off in response to a processor determining that the muted input audio or a portion thereof was not intended (or at least not likely intended) to be muted. In this way, the processor may initiate a playback of at least those portions of the muted input audio considered unintentionally muted.

Figure 2:
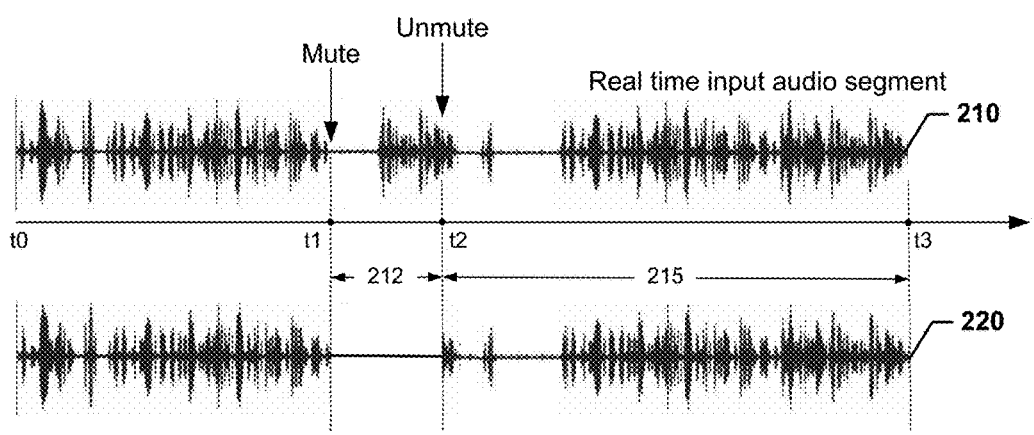
FIG. 2 is a graphical representation of a real time input audio segment compared to a conventional third party output audio segment, in accordance with various embodiments.

FIG. 2 illustrates a graphical representation of an example of sound corresponding to a segment of a real time input audio stream (i.e., a real time input audio segment 210) detected by a microphone of a sending communication device compared to a conventional (i.e., a third party output audio segment 220) output to a third party. A flat line region of the graphs represent little or no audible sound, while the deviations above and below the lines represent varying volume levels. The time t0 represents the beginning of a real time input audio segment 210. The time t1 corresponds to when a mute function is turned on at the sending communication device (i.e., mute). The time t2 represents when the mute function is turned off at the sending communication device (i.e., un-mute). The portion of the real time input audio segment 210 between times t1 and t2 may be referred to as the muted input audio portion 212. The portion of the real time input audio segment 210 after the mute function is turned off at time t2 may be referred to as the post-mute input audio portion 215. The muted input audio portion 212 includes a brief period of silence at the beginning followed by some speech. Thereafter, the post-mute input audio portion 215 includes a mix of silent periods and speaking periods. The time t3 represents an end of the real time input audio segment 210. The time t0 represents the beginning of the real time input audio segment 210, as well as the time at which the third party output audio segment 220 begins, disregarding transmission delays.

The third party output audio segment 220 may look similar to the real time input audio segment 210, but with the muted input audio portion 212 replaced with a flat line (i.e., no sound is output). In other words, conventionally muting a communication device effectively turns the microphone off so an output audio segment would begin and end at virtually the same time as the real time input audio segment 210, but with one large intermediate silent period corresponding to the muted input audio portion 212.

Figure 3A:
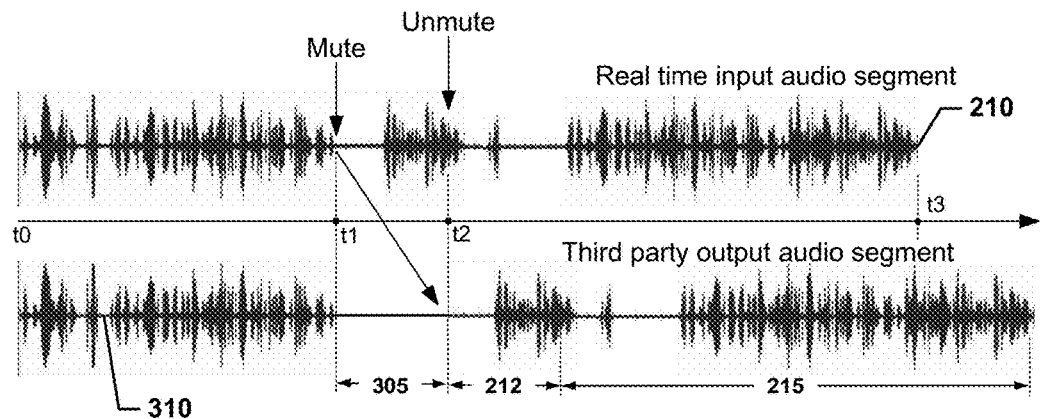
FIG. 3A is a graphical comparison of the real time input audio segment of FIG. 2 and a complete muted period buffer playback as part of a third party output audio segment in accordance with various embodiments.
Figure 3B:
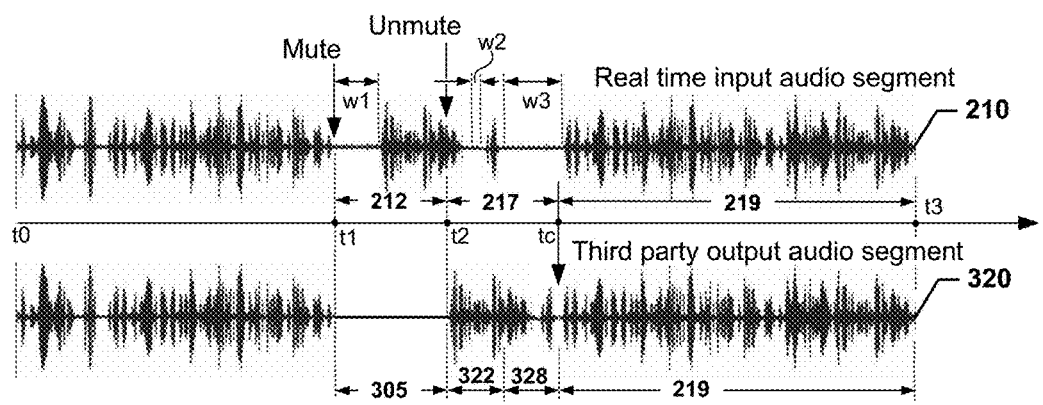
FIG. 3B is a graphical comparison of the real time input audio segment of FIG. 2 and a modified buffer playback of muted and post-muted output audio periods with silent periods removed in accordance with various embodiments.
Figure 3C:
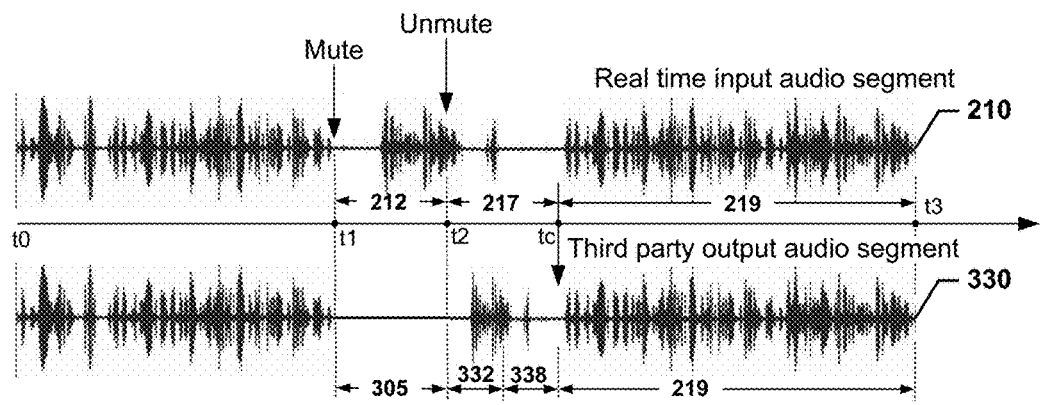
FIG. 3C is a graphical comparison of the real time input audio segment of FIG. 2 and a modified buffer playback that is partially sped up in accordance with various embodiments.

FIGS. 3A-3C compare the real time input audio segment 210 and different third party output audio segments for the receiving device in accordance with various embodiments. In each of FIGS. 3A-3C, the top graph corresponds to the real time input audio segment 210, while the bottom graphs respectively correspond to different segments of output audio streams (i.e., third party output audio segments 310, 320, 330) transmitted to a receiving communication device. The flat line region of the respective graphs again represents no sound or substantially no audible sound, while the deviations above and below the lines represent varying volume levels. The time t0 represents the beginning of the real time input audio segment 210, as well as the corresponding time that the third party output audio segments 310, 320, 330 begin, disregarding transmission delays.

While the mute function is on, a processor of the sending device prevents the input audio from being output at the receiving device, thus the differences in the compared graphs begin when the mute function is activated. In this way, the portion of the real time input audio segment 210 prior to the mute function being turned on at time t1 may be identical to the portions of the third party output audio segments, 310, 320, 330 during the same period. In contrast, the portions of the third party output audio segments, 310, 320, 330 after time t1 differ from each other and from the corresponding portions (e.g., 212, 215) of the real time input audio segment 210.

FIG. 3A illustrates the real time input audio segment 210 compared to a third party output audio segment 310 that includes a complete muted period playback, in accordance with various embodiments. A complete muted period playback includes a playback of the entire muted input audio portion (e.g., 212 in FIG. 2) unmodified but time-shifted to begin at t2, which may be useful in circumstances when the mute function is unintentionally or mistakenly turned on. In some embodiments, such as represented in FIG. 3A, the complete muted period playback may be immediately followed by a playback of the buffered post-mute input audio portion (e.g., 215 in FIG. 2).

The third party output audio segment 310 may be identical to the real time input audio segment 210 from time t0 to time t1. At time t1, in addition to initially preventing the muted input audio portion (e.g., 212) from being output to the third party on the receiving communication device, a processor of the sending communication device redirects the muted input audio portion to a buffer. Between times t1 and t2, which corresponds to the muted period, the third party output audio segment 310 has a flat line reflecting a silent mute portion 305. At time t2, the third party output audio segment 310 continues initially with a playback from the buffer of the entire muted input audio portion 212 followed immediately by a playback of the subsequent post-mute input audio portion 215. The subsequent post-mute input audio portion 215 is also saved in a buffer at least until it is played back following the playback of muted input audio portion 212. Because an unmodified version of the muted input audio segment is added after the silent mute portion 305, the third party output audio segment 310 ends sometime after the end time t3 of the real time input audio segment 210.

FIG. 3B illustrates the real time input audio segment 210 compared to another third party output audio segment 320 that includes a modified version of the playback segments, in accordance with various embodiments. Playback of a modified version of the muted and post-muted portions may be useful for catching up to ongoing real time input audio segments after the mute function is turned off. In some embodiments, such as represented in FIG. 3B, periods of silence may be removed from the muted input audio portion 212 and at least part of the post-muted input audio portion (e.g., 217). The user of the sending communication device may want the third party to hear the muted input audio portion 212, but does not mind leaving out extended periods of silence, such as three or more seconds. In addition, cutting out periods of silence may allow the third party output audio stream to catch up to the real time input audio stream.

The third party output audio segment 320 is also identical to the real time input audio segment 210 from time t0 to time t1. At time t1, in addition to initially preventing the muted input audio portion 212 from being output to the third party on the receiving communication device, a processor of the sending communication device redirects the muted input audio portion 212 to a buffer. Between times t1 and t2, which corresponds to the muted period, the third party output audio segment 320 has a flat line reflecting a silent mute portion 305. Meanwhile, a processor may analyze the muted input audio portion 212 and generate a modified muted input audio portion 322, which includes all or most of the audible segments, but omits the period of silence w1. For example, a period of three seconds or more of silence may be considered periods of silence targeted for removal before playback from the buffer. The predetermined length defining periods of silence may be shorter or longer than 3 seconds as desired. This predetermined length may be a default value or may be adjustable by a user. At time t2, the third party output audio segment 320 may initially include a playback of the modified muted input audio portion 322. Omitting periods of silence (e.g., w1) means a duration of the modified muted input audio portion 322 may be substantially shorter than the unmodified original (e.g., 212).

In addition, a processor may analyze from the buffer the post-muted input audio portion (e.g., 215) or parts thereof 217, 219 for cutting out additional periods of silence. For example, an analysis may reveal the first post-mute input audio portion 217 includes periods of silence w2, w3 that could be omitted during playback to speed up the playback without affecting the recorded speech. In this way, a processor may generate a modified post-mute input audio portion 328, which includes all or most of the audible segments, but omits the periods of silence w1, w2. As with the modified muted input audio portion 322, omitting periods of silence (e.g., w2, w3) means a duration of the modified post-mute input audio portion 328 may be substantially shorter than the unmodified original (e.g., 217).

By cutting out or skipping periods of silence, the third party output audio segment 320 may catch up to the real time input audio segment 210. For example, at time tc the third party output audio segment 320 has caught up to the real time input audio segment. Catching up may be achieved because a duration of both the modified muted input audio portion 322 and the modified post-mute input audio portion 328 combined are approximately the same as the unmodified first post-mute input audio portion 217. Once caught up, the processor may stop redirecting input audio to the buffer and may allow the input audio to immediately output from the receiving communication device. In this way, after time tc, the buffer does not need to be used and a second post-mute audio portion 219 occurs at substantially the same time on both the real time input audio segment 210 and the third party output audio segment 320.

FIG. 3C illustrates the real time input audio segment 210 compared to a further third party output audio segment 330 that includes a differently modified version of the playback segments, in accordance with various embodiments. In some embodiments, such as represented in FIG. 3B, a speed may be increased of the buffered audio portions, such as the muted input audio portion 212 and the first part of the post-muted input audio portion 217. The user of the sending communication device may want the third party to hear the muted input audio portion 212, but does not mind it being played back at a faster speed than the original. In addition, speeding up the playback may allow the third party output audio stream to catch up to the real time input audio stream and may avoid a complex input audio analysis. A processor may have a set catch up speed, which reflects the fastest speed at which the modified audio speech remains understandable. For example, the catch up speed may reflect a percentage increase in the playback speed (e.g., 10%) from the original. In addition, the catch up speed may vary based on the speech buffered. Some people speak slowly allowing their speech to be sped up more while remaining understandable. The user of the sending device may also be offered a dial-pad option to speed up or slow down the playback to be able to fast forward quickly through irrelevant parts and slow down the replay for significant parts of the conversation.

In this way, the third party output audio segment 330 may also be identical to the real time input audio segment 210 from time t0 to time t1. At time t1, in addition to initially preventing the muted input audio portion 212 from being output to the third party on the receiving communication device, a processor of the sending communication device redirects the muted input audio portion 212 to a buffer. Between times t1 and t2, which corresponds to the muted period, the third party output audio segment 320 has a flat line reflecting a silent mute portion 305. Meanwhile, a processor may generate a modified muted input audio portion 332. At time t2, the third party output audio segment 320 may initially include a playback of the modified muted input audio portion 332. Generating a sped up version of the muted input audio portion 212 means a duration of the modified muted input audio portion 332 may be substantially shorter than the unmodified original (e.g., 212).

In addition, a processor may generate a similarly modified sped up version from the buffer of the post-muted input audio portion (e.g., 215) or parts thereof 217, 219. In this way, a processor may generate a modified post-mute input audio portion 338 that includes a sped up version of the entire contents of the first part of the post-muted input audio portion 217. As with the modified muted input audio portion 332, increasing the speed of the post-muted input audio portion 217 means a duration of the modified post-mute input audio portion 338 may be substantially shorter than the unmodified original (e.g., 217).

By speeding up portions in the buffer, the third party output audio segment 330 may catch up to the real time input audio segment 210. For example, at time tc the third party output audio segment 330 has caught up to the real time input audio segment. Catching up may be achieved because a duration of both the modified muted input audio portion 332 and the modified post-mute input audio portion 338 combined are approximately the same as the unmodified first post-mute input audio portion 217. Once caught up, the processor may stop redirecting input audio to the buffer and may allow the input audio to immediately output from the receiving communication device. In this way, after time tc, the buffer does not need to be used and a second post-mute audio portion 219 occurs at substantially the same time on both the real time input audio segment 210 and the third party output audio segment 330.

In various embodiments, a processor of the sending communication device 200 may redirect the muted or post-muted input audio portions to a buffer. That buffer may reside in an onboard memory of the sending communication device 200. Alternatively, the buffer may reside in a remote memory, such as the receiving communication device (e.g., 201, 202) or an intermediate network resource, like a network server or database (e.g., 111, 112).

Figure 4:
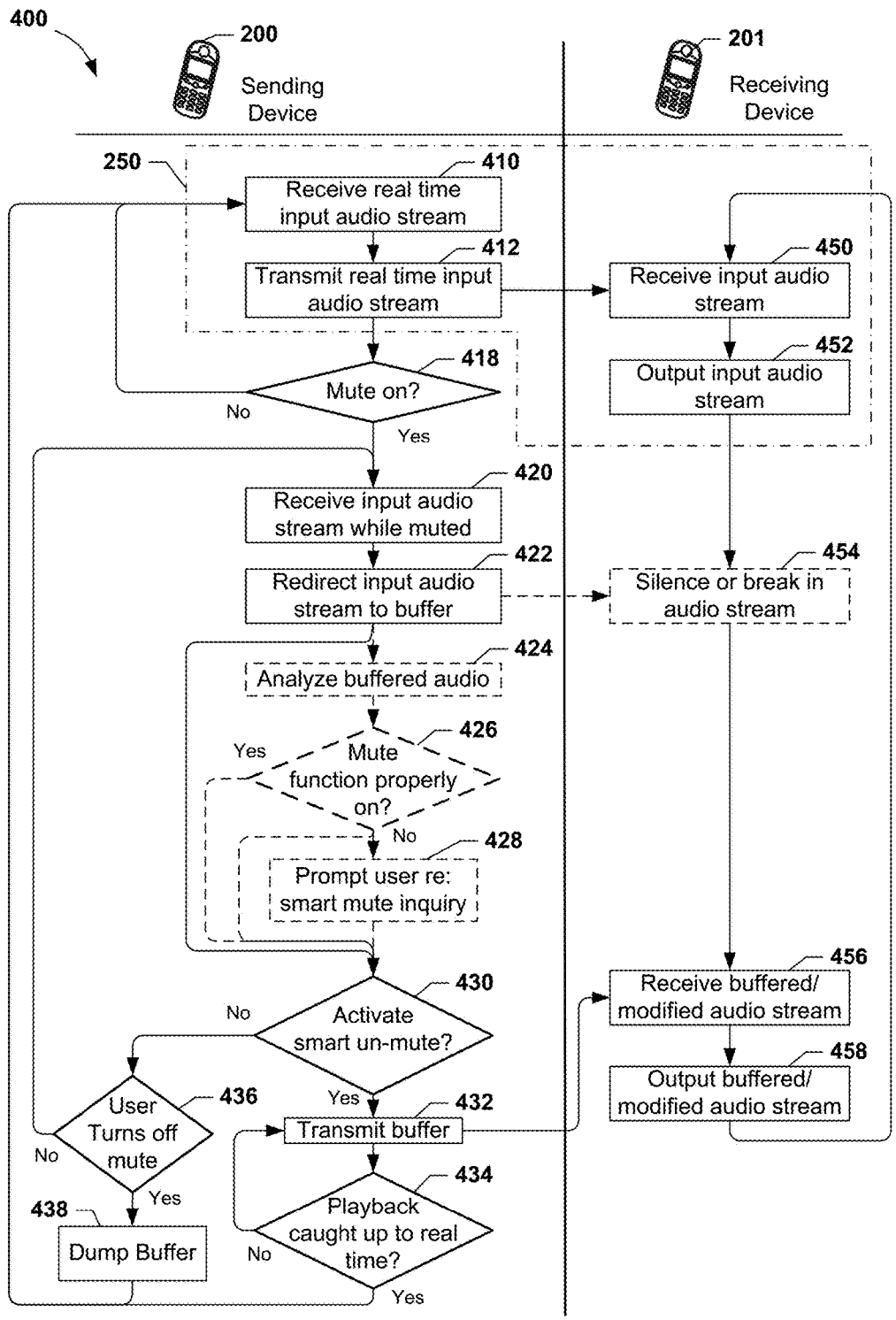
FIG. 4 is a process flow diagram illustrating an embodiment method of controlling voice call audio transmissions with a smart mute function in which sound is buffered in the sending communication device when its mute function is activated.

FIG. 4 illustrates an embodiment method 400 in which segments of a voice call audio stream are buffered on the sending communication device (e.g., 200) before transmission to a third party. The sending communication device (i.e., sending device) represents the device in which the mute function is activated, while the receiving communication device (i.e., receiving device) represents the at least one other device used by a third party participant to an active voice call. Any device at any point during the call may be considered the sending device if and/or when it activates the mute function.

Prior to activating the mute function, the method 400 may operate similar to a conventional voice call that communicates an ongoing audio stream from a sending device to a receiving device, which is referred to herein as standard operations 250. Standard operations 250 may include the operations of blocks 410, 412 for the sending device 200 and blocks 450, 452 for the receiving device 201. In this way, in block 410, the sending device may receive a real time input audio stream. The real time input audio stream includes the ambient sounds detected by the microphone of the sending device 200 during an active voice call. In block 412, the real time input audio stream may be transmitted via a communication network (e.g., 100) to receiving device 201. The transmission of the real time input audio stream in block 412 is referred to as a real time transmission, as there is no substantial delay between when the sounds are detected by the microphone to when signals corresponding to those sounds are transmitted to and received by the receiving device 201. In block 450, the receiving device receives the input audio stream and outputs the input audio stream in block 452 using a speaker on or coupled to the receiving device.

At any point after an active voice call has been established, the processor of the sending device 200 may determine whether the mute function is on in determination block 418. The mute function may either be on or off, as with conventional mute functions, so the processor may check the status of a switch or indicator relating to the mute function in order to determine whether the mute function is on. In various embodiments, the mute function may be associated with a smart mute feature that saves and plays back muted input audio portions (e.g., 212) and subsequent portions (i.e., speech recorded while the recorded sound is being played back). The smart mute feature may include a smart mute buffer function, which initially operates to save a muted input audio stream in a buffer. In addition, the smart mute feature may include a smart un-mute function, which may be used to playback the buffered input audio.

If the mute function is determined to be off (i.e., determination block 418="No"), the sending device processor may resume standard operations 250 in block 410. If the mute function is determined to be on (i.e., determination block 418="Yes"), the sending device processor may continue receiving the input audio stream while muted (e.g., 212) as part of the smart mute buffer function of the smart mute feature in block 420.

In block 420, the smart mute buffer function of the smart mute feature keeps the sending device microphone on, unlike a conventional mute function that turns the microphone off when muting. This enables the sending device to continue receiving an input audio stream (i.e., ambient sounds) while muted. In addition, the smart mute buffer function stops the transmission to the receiving device 201 of the input audio stream received once the mute function is on.

In block 422, a processor of the sending device may redirect the input audio stream from the microphone to an onboard memory buffer where the audio data is stored. The onboard memory buffer may be a general onboard memory unit of the sending device or a dedicated onboard memory unit. The buffer may be of a finite size, such as sufficient to store one or two minutes of sound, and configured as a first-in-first-out buffer. Redirecting the audio stream to the buffer in the smart mute feature prevents the muted input audio stream from being output to the receiving device, resulting in silence or a perceived break in the audio stream at the receiving device in block 454. The buffered input audio stream may subsequently be played back as part of a smart un-mute function or may be erased as part of turning off mute in a standard way or termination of the active voice call as described. Optionally, if a call is terminated while the buffer maintains portions of the muted input audio stream, a user of the sending device may be prompted whether to save or delete the buffered audio. For example, saved audio segments could be transmitted to the receiving device in a subsequent call or as an audio file attachment to an electronic message. If a call is dropped or terminated, but reconnected between the same participants within a predetermined period (e.g., within one minute), the processor may provide an option to the user to either playback or delete the buffered audio. When the call reconnection occurs after a significant delay (i.e., after the predetermined period) or the reconnected call contains different participants, the buffered audio may be automatically deleted or saved according to user preference settings.

Optionally in block 424, the processor of the sending device may analyze the buffered input audio data using speech analysis methods or software. In determination block 430, the processor of the sending device may determine whether a smart un-mute function, which is a part of the smart mute feature, has been activated. The smart un-mute function provides for the playback of buffered input audio in accordance with various embodiments.

The analysis of the buffered input audio in block 424 may be used by the processor in determining whether the mute function is supposed to be on, based on predetermined conditions identified from the buffered audio itself, and possibly other inputs. The predetermined conditions may include an association with at least one of a key word, a language, a context of the active voice call, a recognized voice, a sensor input of the communication device, and/or other considerations used to analyze the buffered input audio. A speech-to-text function performed on the buffered audio data by the processor may identify words within in the buffered input audio for analysis. For example, a speech-to-text function may help determine that the active voice call involved only a single language, while the initially muted input audio included words from a different language. In this way, the point at which the buffered input audio changes back to the active voice call language may indicate the mute function should not be on. In addition, key words common in a context of the active voice call (e.g., work-related jargon not commonly used elsewhere), as well as key words with a high likelihood of not being related to the active voice call (e.g., particular names or things) may be used in the analysis. Further, voice recognition may identify the individuals speaking in the active voice call, other individuals speaking while mute is on, and use this information in the analysis. Also, an image sensor, such as one of the sending device's cameras, may provide visual clues regarding the likelihood the buffered input audio should properly be muted as described with reference to FIGS. 8A-9.

The analysis of the buffered input audio in block 424 may provide additional information for use in determining whether the mute function was properly on. For example, if the mute function was intentionally turned on, the initial portion of muted input audio may be properly muted, but a subsequent portion may be improperly muted. If, for example, the user forgets mute is on and resumes speaking to the active voice call, an analysis of the speech may determine this. Thus, the analysis of the buffered input audio may additionally determine that only a portion of the buffered input audio is improperly muted. In this way, the analysis of the muted input audio may determine a starting point in the buffered input audio in which the improperly muted input audio begins.

Following the optional buffered input audio analysis in block 424, the processor of the sending device may determine whether the mute function should be on in determination block 426 (i.e., mute function properly on?). In other words, although the mute function is on, based on the analysis of the buffered input audio in block 424, the processor may determine whether the mute function is supposed to be on and if not, the point in the buffered input audio at which the improperly muted portion begins.

If the mute function is determined to be properly on (i.e., determination block 426="Yes"), the sending device processor may determine whether the smart un-mute function should be activated in determination block 430. If the mute function is determined not to be properly on (i.e., determination block 426="No"), the sending device processor may optionally prompt the user of the sending device to confirm that determination and inquire whether smart un-mute function should be activated in block 428. This may also allow the user to override an improper determination regarding whether the mute function is properly on. Such user input may also help train the processor for future determinations regarding the likelihood particular speech and/or circumstances are intended to occur while mute is on.

If the mute function is determined not to be properly on (i.e., determination block 426="No"), the processor may not prompt the user in block 428, and proceed directly to determination block 430.

In determination block 430, the processor may determine whether the smart un-mute function of the smart mute feature should be activated. This determination may be based on a user input or from an automatic determination made without giving the user the option to override. The user input may be independently initiated by the user following blocks 420, 422 (i.e., without prompting from a smart mute inquiry in block 428). For example, the user may activate the smart un-mute function through a user input after realizing the mute function should not have been on. Alternatively, the user input may be in response to prompting, such as in block 428. An automatic determination may be when the processor determines that the mute function is not properly on, but the user is not prompted for input (e.g., determination block 426="No", but directly proceeding to determination block 430).

If the processor determines that the smart un-mute function should be activated (i.e., determination block 430="Yes"), the sending device processor may initiate transmission of the buffer contents in block 432. If the processor determines that the smart un-mute function should not be activated (i.e., determination block 430="No"), the sending device processor may further determine whether the user has turned off the mute function, in a conventional sense in determination block 436.

In block 432, the activation of the smart un-mute function may immediately start the transmission of the buffered audio stream (i.e., the contents of the audio input buffer) to the sending device. In addition, as part of activating the smart un-mute function; the sending device will effectively remain muted to the other device(s). The sending device may effectively remain muted because the transmitted audio will be played from the buffer (i.e., at least one portion of the buffer is played back) while any additional input audio picked up from the microphone will continue to be stored in the buffer (i.e., redirecting a further input audio stream to the buffer). Such additional input audio may be stored in the buffer until a playback of the buffer possibly catches up with the real-time input audio stream. For example, by cutting out periods of silence (e.g., 322, 328) or speeding up the audio playback (e.g., 332, 338), the playback of the buffer may catch up. In this way, the buffered audio stream transmitted to the receiving device may include one or more modified audio segments for catching up to the real-time input audio stream. The modified audio segments may be generated by removing period(s) of silence (described above with regard to FIG. 3B) and/or speeding up the input audio segment (described above with regard to FIG. 3C). In addition, the sped up input audio segment(s) may be further modified to maintain an original pitch of the input audio for making the playback sound more natural.

In determination block 434, the processor may determine whether the playback has caught up in real-time to the real-time input audio stream. Modifying the buffered input audio means a playback of the buffer contents may occur faster than recorded in real-time, enabling the playback of the modified version of the buffer or portions to catch up to the real-time input audio stream. If the playback has not caught up to the real-time input audio stream (i.e., determination block 434="No"), the sending device processor may continue transmitting the buffer contents (including any modified segments thereof) to the receiving device, via a communication network (e.g., 100) in block 432. If the playback has caught up to the real-time input audio stream (i.e., determination block 434="Yes"), the sending device processor may resume standard operations 250 in block 410, which no longer saves input-audio to the buffer.

On the receiving device side in block 456, the receiving device 201 may receive the buffered and possibly modified audio stream from the sending device 200. In block 458, the receiving device may output the buffered audio stream received in block 456 for a third party user to hear. The resumption of audio output in block 458, following the silence from block 454, may sound similar to what occurs following a conventional mute function being turned off. A user of the receiving device (e.g., 21), may not be able to tell the playback of the buffered/modified audio stream is not live (i.e., not part of the real-time input audio stream). Once the buffered/modified audio stream is finished being output in block 458, the receiving device may resume the standard operations 250 in block 450.

In determination block 436, the processor of the sending device 200 may determine whether the user has turned off mute in a standard sense. In some embodiments, the user may be provided with two options for turning off mute. One option for turning off mute may use the smart un-mute function in block 432, while another option may use a standard un-mute function that resumes transmission of the real-time input audio stream without using the buffered input audio.

If the processor determines that the user has turned off mute in a standard sense (i.e., determination block 436="Yes"), the sending device processor may erase (i.e., "dump") the buffer contents in block 438, and resume the standard operations 250 in block 410. If the processor determines that the user has not turned off mute (i.e., determination block 436="No"), the sending device processor may continue receiving the input audio stream while muted as part of the smart mute buffer function of the smart mute feature in block 420.

Figure 5:
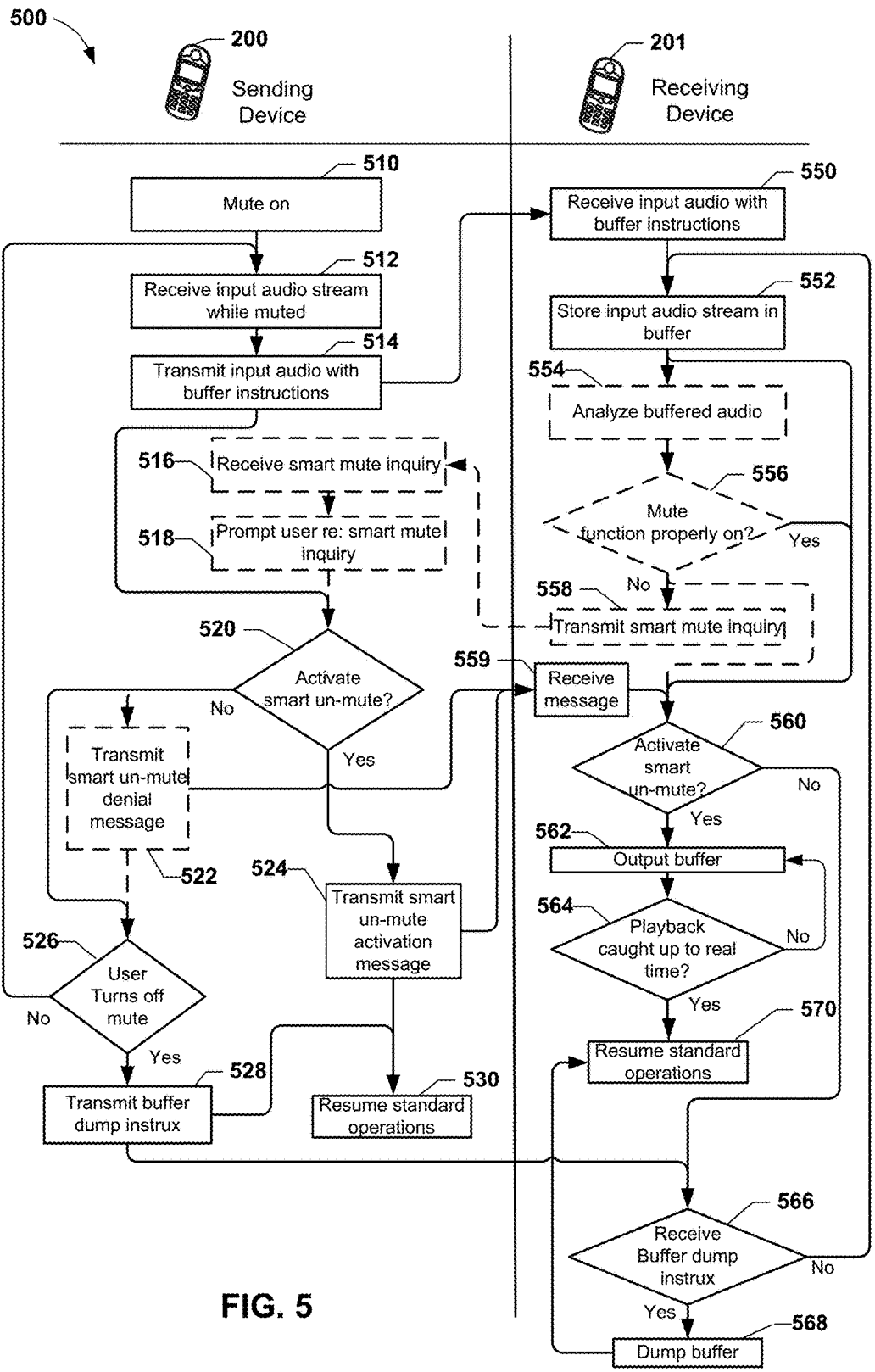
FIG. 5 is a process flow diagram illustrating an embodiment method of controlling voice call audio transmissions with a smart mute function in which sound is buffered in the receiving communication device when mute function of the sending communication device is activated.

In FIG. 5 is a process flow diagram illustrating an embodiment method 500 in which segments of a voice call audio stream from the sending device 200 are transmitted to and buffered on the receiving device 201 before potentially being output on the receiving device 201 in accordance with various embodiments. The sending device 200 may be the device in which the mute function is activated, while the receiving device 201 represents the at least one other device used by a third party participant to an active voice call. Any device at any point during the call may be considered the sending device if and/or when it activates the mute function.

In block 510, the mute function is turned on. Prior to turning on the mute function, the sending device 200 and the receiving device 201 may operate using standard operations (e.g., 250). In various embodiments, turning on the mute function may be associated with a smart mute feature, which may initially include a smart mute buffer function and may eventually include a smart un-mute function. Turning on the mute function prevents and/or interrupts the exchange of the real time input audio stream and begins a muted period.

In block 512, the sending device processor may continue receiving the input audio stream while muted (e.g., 212) as part of the smart mute buffer function of the smart mute feature.

In block 514, a processor of the sending device 200 may redirect the input audio stream, as detected by the microphone, by transmitting the received input audio stream with buffer instructions via a communication network (e.g., 100) to the receiving device 201. In this way, redirecting the input audio stream to the buffer may include transmitting the input audio stream to the receiving device 201 (i.e., a remote resource) for storing. Although the sending device processor transmits the muted input audio stream to the receiving device 201, the buffer instructions prevent the muted input audio stream from being output at the receiving device. This results in silence or a perceived break in the audio stream at the receiving device as compared to just prior to when the mute function was turned on. The buffered input audio stream may subsequently be played back as part of a smart un-mute function or may be erased as part of turning off mute in a standard way or termination of the active voice call.

On the receiving device side in block 550, the receiving device may receive the input audio stream with buffer instructions, transmitted from the sending device in block 514. In block 552, the receiving device processor executing the received buffer instructions may save the received input audio stream to an onboard memory buffer. The onboard memory buffer may be a general onboard memory unit of the receiving device or a dedicated onboard memory unit thereof. Optionally, if a call is terminated while the buffer maintains portions of the muted input audio stream, a user of the receiving or sending device may be prompted whether to save or delete the buffered audio. For example, a text message inquiry may be transmitted to the sending device, saved audio segments may be transmitted back to the sending device as an audio file attachment to an electronic message, or saved audio segments may be output on the receiving device in a subsequent call. In addition, if a call is dropped or terminated, but reconnected between the same participants within a predetermined period (e.g., within one minute), the receiving device processor may provide the user with an option to either playback or delete the buffered audio. When the call reconnection occurs after a significant delay (i.e., after the predetermined period) or the reconnected call contains different participants, the buffered audio may be automatically deleted according to user preference settings.

Optionally in block 554, the processor of the receiving device 201 may analyze the buffered input audio. This optional analysis may be similar to buffered audio analysis in FIG. 4, block 424, except that the analysis in block 554 may be executed by the processor of the receiving device. Also like the buffered audio analysis in FIG. 4, block 424, the analysis of the buffered input audio in block 554 may additionally determine a starting point in the buffered input audio in which improperly muted input audio begins. If no buffered input audio analysis is available (e.g., block 554), the receiving device processor may otherwise proceed to determine whether smart un-mute should be activated in determination block 560. Activation of the smart un-mute function may playback the buffered input audio in accordance with various embodiments.

Following the optional buffered input audio analysis in block 554, in determination block 556 the processor of the receiving device may determine whether the mute function should be on (i.e., mute function properly on?). If the mute function is determined to be properly on (i.e., determination block 556="Yes"), the receiving device processor may determine whether smart un-mute should be activated in determination block 560. If the mute function is determined not to be properly on (i.e., determination block 556="No"), the receiving device processor may optionally transmit a smart mute inquiry in block 558, to the sending device. The smart mute inquiry may allow the user of the sending device to confirm the mute function was not properly on before activating the smart un-mute function. Alternatively, if the mute function is determined not to be properly on (i.e., determination block 556="No"), the receiving device processor may (rather than transmit a smart mute inquiry in block 558) proceed directly to determine whether the smart un-mute function should be activated in determination block 560.

Back on the sending device side, in block 516, the sending device may receive the smart mute inquiry, if sent in block 558. In response to receiving the smart mute inquiry, the sending device processor may prompt the user of the sending device to confirm whether smart un-mute function should be activated in block 518. This may also allow the sending device user to override an improper determination regarding whether the mute function is properly on. Such user input may also help train the receiving device processor for future determinations regarding the likelihood particular speech and/or circumstances are intended to occur while mute is on.

In determination block 520, the sending device processor may determine whether the smart un-mute function of the smart mute feature should be activated. This determination may be based on a user input. The user input may be independently initiated by the user following blocks 510, 512, 514 (i.e., without prompting from a smart mute inquiry in block 518). For example, the user may activate the smart un-mute function through a user input after realizing the mute function should not have been on. Alternatively, the user input may be in response to prompting, such as in block 518.

If the sending device processor determines that the smart un-mute function should be activated (i.e., determination block 520="Yes"), the sending device processor may transmit a smart un-mute activation message to the receiving device in block 524. Following the transmission of the smart un-mute activation message in block 524, the sending device may resume standard operations in block 530. If the sending device processor determines that the smart un-mute function should not be activated (i.e., determination block 520="No") in response to receiving the smart mute inquiry in block 516, the sending device processor in block 522 may transmit a smart un-mute denial message to the receiving device. After transmitting the smart un-mute denial message in block 522, the sending device processor may further determine whether the user has turned off the mute function, in a conventional sense, in determination block 526. Otherwise, if the sending device processor determines that the smart un-mute function should not be activated (i.e., determination block 520="No") without involving a smart mute inquiry, the sending device processor may proceed directly to determine whether the user has turned off the mute function in determination block 526.

In determination block 526, the processor of the sending device 200 may determine whether the user has turned off mute in a standard sense. In some embodiments, the user may be provided with two options for turning off mute. One option for turning off mute may use the smart un-mute function in block 524, while another option may use a standard un-mute function that resumes transmission of the real-time input audio stream without using the buffered input audio.

If the sending device processor determines that the user has turned off mute in a standard sense (i.e., determination block 526="Yes"), the sending device processor may transmit buffer dump instructions in block 528, to the receiving device. In addition to transmitting the buffer dump instructions in block 528 to the receiving device, the sending device processor may resume standard operations (e.g., 250) in block 530. If the sending device processor determines that the user has not turned off mute (i.e., determination block 526="No"), the sending device processor may continue receiving the input audio stream while muted as part of the smart mute buffer function of the smart mute feature in block 512.

Back on the receiving device side, in block 559 the receiving device may receive either a smart un-mute denial message (transmitted in block 522) or a smart un-mute activation message (transmitted in block 524). Such messages may be received in response to transmitting the smart mute inquiry in block 558.

In determination block 560, the receiving device processor may determine whether the smart un-mute function of the smart mute feature should be activated. This determination may be based on whether a message was received in block 559, and if so which one. Alternatively, the determination in determination block 560 may be based on automatic determinations, such as from determination block 556, made without giving the user the option to override. As a further alternative, if no buffer analysis is available in block 554, the determination in determination block 560 may follow the storing of the input audio stream in block 552.

If the receiving device processor determines that the smart un-mute function should be activated (i.e., determination block 560="Yes"), the receiving device processor may initiate output of the buffer contents in block 562. If the receiving device processor determines that the smart un-mute function should not be activated (i.e., determination block 560="No"), the sending device processor may further determine whether buffer dump instructions have been received in determination block 566.

In block 562, the activation of the smart un-mute function may immediately start the output of the buffer contents (i.e., the contents of the audio input buffer). The output of the buffer contents in block 562 may use an onboard speaker of the receiving device 201 or peripheral speaker with a wired or wireless connection. The resumption of audio output in block 562, following the silence from block 550, may sound similar to what occurs following a conventional mute function being turned off. A user of the receiving device (e.g., 21), may not be able to tell the playback of the buffered/modified audio stream is not live (i.e., not part of the real-time input audio stream).

In addition, as part of the smart un-mute function being activated, the sending device will effectively remain muted with regard to any real-time input audio stream at the sending device. The sending device effectively remains muted because the output audio will be played as an output from the buffer on the receiving device. Meanwhile, any additional real-time input audio picked up at the sending device continues to be transmitted to and stored in the buffer at the receiving device until a playback of the buffer possibly catches up with the real-time input audio stream. In the method 500, the options for playback of the buffer to catch up to the real-time input audio, such as by generating a modified audio output, may be similar to those described with regard to method 400.

In determination block 564, the receiving device processor may determine whether the playback has caught up to the real-time input audio stream. Modifying the buffered input audio means a playback of the buffer contents may occur faster than recorded in real-time. In this way, the playback of the modified version of the buffer or portions thereof may catch up to the real-time input audio stream. If the playback has caught up to the real-time input audio stream (i.e., determination block 564="Yes"), the sending device processor may resume standard operations in block 570, which no longer saves input-audio to the buffer. If the playback has not caught up to the real-time input audio stream (i.e., determination block 564="No"), the receiving device processor may continue outputting the buffer contents (including any modified segments thereof) in block 562.

In determination block 566, the receiving device processor may determine whether buffer dump instructions have been received. If buffer dump instructions were received (i.e., determination block 566="Yes"), the receiving device processor may erase (i.e., dump) the buffer contents in block 568, and resume standard operations in block 570. If no buffer dump instructions were received (i.e., determination block 566="No"), the receiving device processor may continue storing the muted input audio stream as part of the smart mute buffer function of the smart mute feature in block 552.

Figure 6:
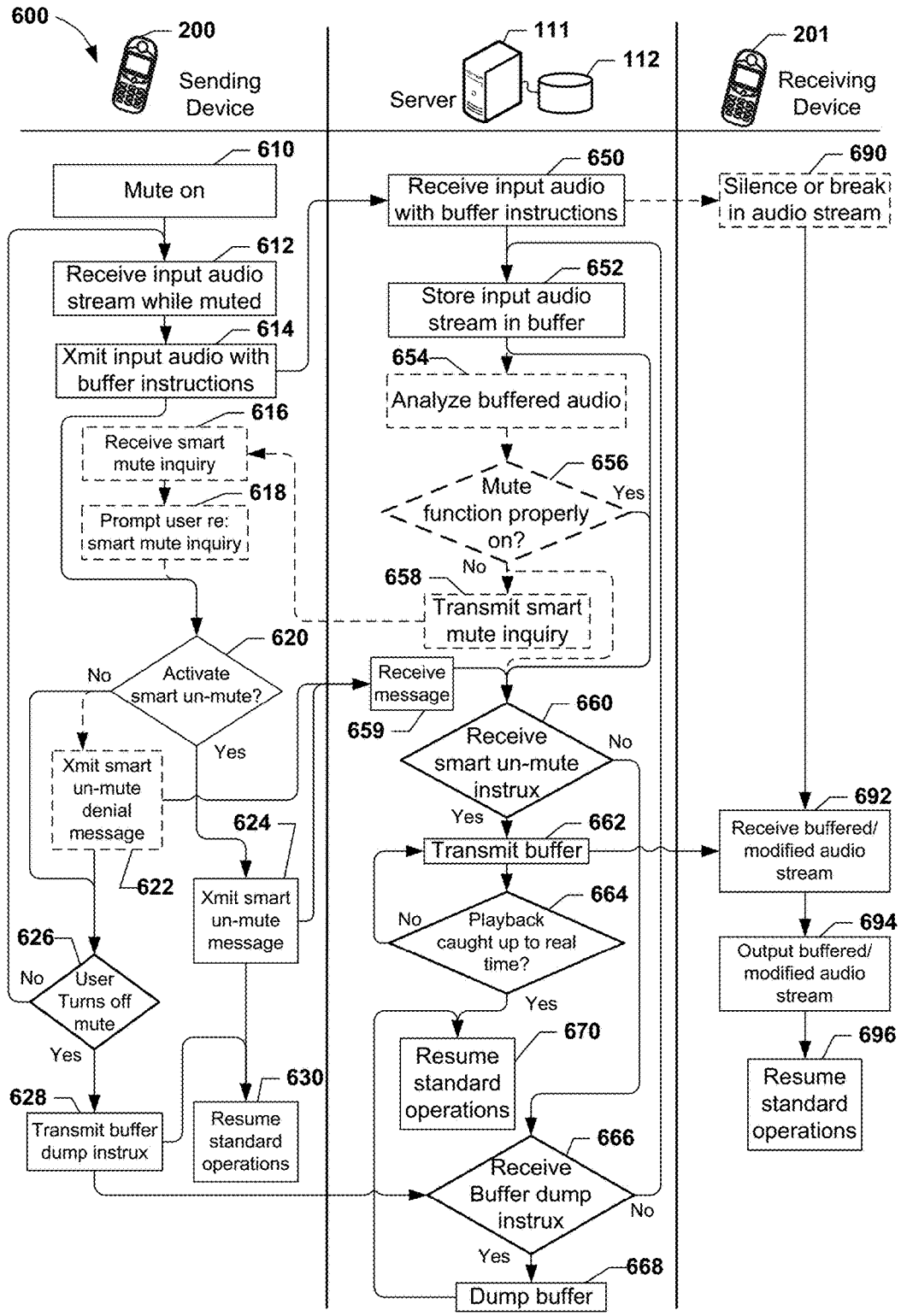
FIG. 6 is a process flow diagram illustrating an embodiment method of controlling voice call audio transmissions in which sound is buffered in a network server when a communication device is on mute.

In FIG. 6 is a process flow diagram illustrating an embodiment method 600 in which a network server 111 stores the buffered voice call audio segments from a sending device 200 before transmission to and output on the receiving device 201, in accordance with various embodiments. The sending device 200 may be the device in which the mute function is activated, while the receiving device 201 represents the at least one other device used by a third party participant to an active voice call. Any device at any point during the call may be considered the sending device if and/or when it activates the mute function. In addition, the network server 111, may be any network resource capable of storing audio stream segments in a network memory buffer 112 or other network memory resource.

In block 610, the mute function is turned on. Prior to turning on the mute function, the sending device 200 and the receiving device 201 may operate using standard operations (e.g., 250). In various embodiments, turning on the mute function may be associated with a smart mute feature, which may initially include a smart mute buffer function and may eventually include a smart un-mute function. Turning on the mute function prevents and/or interrupts the exchange of the real time input audio stream and begins a muted period.

In block 612, the sending device processor may continue receiving the input audio stream while muted (e.g., 212) as part of the smart mute buffer function of the smart mute feature.

In block 614, a processor of the sending device 200 may redirect the input audio stream, as detected by the microphone, by transmitting the received input audio stream with buffer instructions via a communication network (e.g., 100) to the network server 111. Although the sending device processor transmits the muted input audio stream to the network server 111, the buffer instructions prevent the muted input audio stream from being output at the receiving device 201. This results in silence or a perceived break in the audio stream at the receiving device in block 690 of the receiving device column, as compared to just prior to when the mute function was turned on. The buffered input audio stream may subsequently be transmitted to the receiving device for playback as part of a smart un-mute function or may be erased as part of turning off mute in a standard way or termination of the active voice call.

In the network server column, in block 650, the network server may receive the input audio stream with buffer instructions, transmitted from the sending device in block 614. In block 652, the network server processor executing the received buffer instructions may save the received input audio stream to a memory buffer. The memory buffer may an integral internal memory unit of the network server, a dedicated memory unit, or a remote network memory buffer 112. Optionally, if a call is terminated while the buffer maintains portions of the muted input audio stream, a user of the receiving device may be prompted whether to save or delete the buffered audio. For example, a text message inquiry may be transmitted to the sending device, saved audio segments may be transmitted back to the sending device as an audio file attachment to an electronic message, or saved audio segments may be transmitted to and output on the receiving device in a subsequent call. In addition, if a call is dropped or terminated, but reconnected between the same participants within a predetermined period (e.g., within one minute), the network server may provide the sending device user with the option (e.g., by sending a recovery inquiry) to either playback or delete the buffered audio. When the call reconnection occurs after a significant delay (i.e., after the predetermined period) or the reconnected call contains different participants, the buffered audio may be automatically deleted according to user preference settings.

Optionally in block 654, the processor of the network server 111 may analyze the buffered input audio. This optional analysis may be similar to buffered audio analysis in FIG. 4, block 424, except that the analysis in block 654 may be executed by the processor of the network server. Also like the buffered audio analysis in FIG. 4, block 424, the analysis of the buffered input audio in block 654 may additionally determine a starting point in the buffered input audio in which improperly muted input audio begins. If no buffered input audio analysis is available (e.g., block 654), the network server processor may otherwise proceed to determine whether smart un-mute should be activated in determination block 660. Activation of the smart un-mute function may transmit the buffered input audio for playback on the receiving device in accordance with various embodiments.

Following the optional buffered input audio analysis in block 654, in determination block 656 the processor of the network server may determine whether the mute function should be on (i.e., mute function properly on?). If the mute function is determined to be properly on (i.e., determination block 656="Yes"), the network server processor may determine whether smart un-mute should be activated in determination block 660. If the mute function is determined not to be properly on (i.e., determination block 656="No"), the network server processor may optionally transmit a smart mute inquiry in block 658, to the sending device. The smart mute inquiry may allow the user of the sending device to confirm the mute function was not properly on before activating the smart un-mute function. Alternatively, if the mute function is determined not to be properly on (i.e., determination block 656="No"), the network server processor may (rather than transmit a smart mute inquiry in block 658) proceed directly to determine whether the smart un-mute function should be activated in determination block 660.

Back in the sending device column, in block 616, the sending device may receive the smart mute inquiry, if sent in block 658. In response to receiving the smart mute inquiry the sending device processor may prompt the user of the sending device to confirm whether smart un-mute function should be activated in block 618. This may also allow the sending device user to override an improper determination regarding whether the mute function is properly on. Such user input may also help train the network server processor for future determinations regarding the likelihood particular speech and/or circumstances are intended to occur while mute is on.

In determination block 620, the sending device processor may determine whether the smart un-mute function of the smart mute feature should be activated. This determination may be based on a user input. The user input may be independently initiated by the user following blocks 610, 612, 614 (i.e., without prompting from a smart mute inquiry in block 618). For example, the user may activate the smart un-mute function through a user input after realizing the mute function should not have been on. Alternatively, the user input may be in response to prompting, such as in block 618.

If the sending device processor determines that the smart un-mute function should be activated (i.e., determination block 620="Yes"), the sending device processor may transmit a smart un-mute activation message to the network server in block 624. Following the transmission of the smart un-mute activation message in block 624, the sending device may resume standard operations in block 630. If the sending device processor determines that the smart un-mute function should not be activated (i.e., determination block 620="No") in response to receiving the smart mute inquiry in block 616, the sending device processor in block 622 may transmit a smart un-mute denial message to the network server. After transmitting the smart un-mute denial message in block 622, the sending device processor may further determine whether the user has turned off the mute function, in a conventional sense, in determination block 626. Otherwise, if the sending device processor determines that the smart un-mute function should not be activated (i.e., determination block 620="No") without involving a smart mute inquiry, the sending device processor may proceed directly to determine whether the user has turned off the mute function in determination block 626.

In determination block 626, the processor of the sending device 200 may determine whether the user has turned off mute in a standard sense. In some embodiments, the user may be provided with two options for turning off mute. One option for turning off mute may use the smart un-mute function in block 624, while another option may use a standard un-mute function that resumes transmission of the real-time input audio stream without using the buffered input audio.

If the sending device processor determines that the user has turned off mute in a standard sense (i.e., determination block 626="Yes"), the sending device processor may transmit buffer dump instructions to the network server in block 628. In addition to transmitting the buffer dump instructions in block 628 to the network server, the sending device processor may resume standard operations (e.g., 250) in block 630. If the sending device processor determines that the user has not turned off mute (i.e., determination block 626="No"), the sending device processor may continue receiving the input audio stream while muted as part of the smart mute buffer function of the smart mute feature in block 612.

Back in the network server column, in block 659 the network server may receive either a smart un-mute denial message (transmitted in block 622) or a smart un-mute activation message (transmitted in block 624). Such messages may be received in response to transmitting the smart mute inquiry in block 658.

In determination block 660, the network server processor may determine whether the smart un-mute function of the smart mute feature should be activated. This determination may be based on whether a message was received in block 659, and if so which one. Alternatively, the determination in determination block 660 may be based on automatic determinations, such as from determination block 656, made without giving the user the option to override. As a further alternative, if no buffer analysis is available in block 654, the determination in determination block 660 may follow the storing of the input audio stream in block 652.

If the network server processor determines that the smart un-mute function should be activated (i.e., determination block 660="Yes"), the network server processor may initiate transmission of the buffer contents to the receiving device 201 in block 662. If the network server processor determines that the smart un-mute function should not be activated (i.e., determination block 660="No"), the sending device processor may further determine whether buffer dump instructions have been received in determination block 666.

In block 662, the activation of the smart un-mute function may immediately start the transmission of the buffer contents (i.e., the contents of the audio input buffer). In addition, as part of the smart un-mute function being activated, the sending device will effectively remain muted with regard to any real-time input audio stream at the sending device. The sending device effectively remains muted because the audio transmitted to the receiving device is transmitted from the buffer, which is not the current real-time input audio stream. Meanwhile, any additional real-time input audio received from the sending device continues to be stored in the buffer at the network server until the playback from the buffer at the receiving device possibly catches up with the real-time input audio stream. In the method 600, the options for the playback of the buffer to catch up to the real-time input audio, such as by generating a modified audio output transmission for the receiving device, may be similar to those described with regard to method 400.

In the receiving device column in block 692, the receiving device 201 may receive the buffered and possibly modified audio stream from the sending device 200. In block 694, the receiving device may output the buffered audio stream received in block 692 for a third party user to hear. The resumption of audio output in block 692, following the silence from block 690, may sound similar to what occurs following a conventional mute function being turned off. A user of the receiving device (e.g., 21), may not be able to tell the playback of the buffered/modified audio stream is not live (i.e., not part of the real-time input audio stream). Once the buffered/modified audio stream is finished being output in block 694, the receiving device may resume the standard operations in block 696.

In determination block 664, the network server processor may determine whether the playback of the buffer contents at the receiving device has caught up to the real-time input audio stream. Modifying the buffered input audio means a playback at the receiving device may occur faster than recorded in real-time. In this way, the playback of the modified version of the buffer or portions thereof may catch up to the real-time input audio stream. If the playback has caught up to the real-time input audio stream (i.e., determination block 664="Yes"), the sending device processor may resume standard operations in block 670, which no longer saves input-audio to the buffer. If the playback has not caught up to the real-time input audio stream (i.e., determination block 664="No"), the network server processor may continue transmitting the buffer contents (including any modified segments thereof) in block 662.

In determination block 666, the network server processor may determine whether buffer dump instructions have been received. If buffer dump instructions were received (i.e., determination block 666="Yes"), the network server processor may erase (i.e., dump) the buffer contents in block 668, and resume standard operations in block 670. If no buffer dump instructions were received (i.e., determination block 666="No"), the network server processor may continue storing the muted input audio stream as part of the smart mute buffer function of the smart mute feature in block 652.

Figure 7:
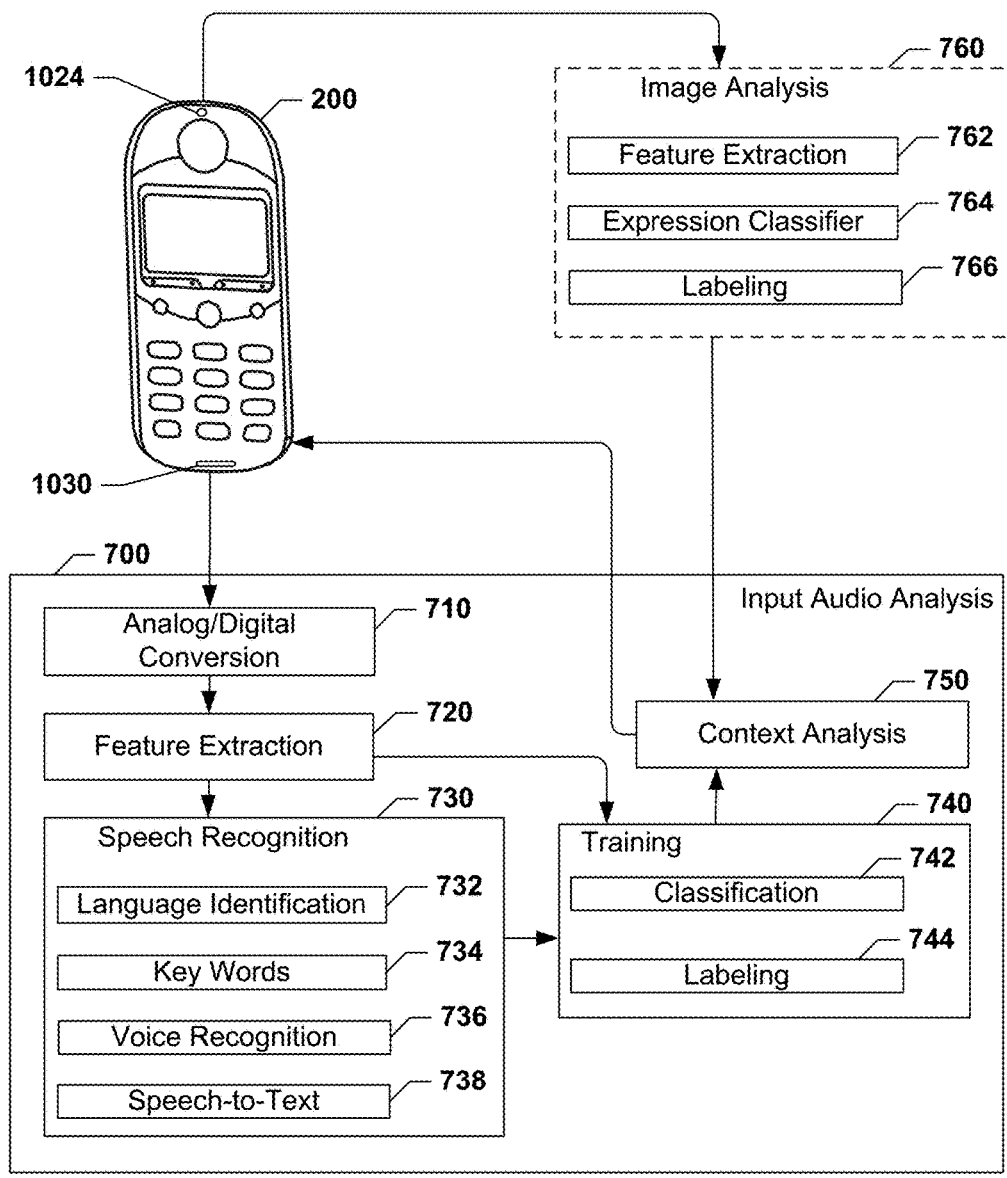
FIG. 7 is a schematic block diagram of an embodiment device for input audio and image analysis.

FIG. 7 illustrates a schematic block diagram of an embodiment receiver device 200 configured for input audio and image analysis. The receiver device 200 includes an input audio analysis module 700, which may be used in conjunction with an optional image analysis module 760. In addition, the receiver device may use an onboard microphone to detect ambient sound, which is received and processed by the input audio analysis module 700. Also, the receiver device may use an image sensor 1024 to collect one or more still or motion images, which may be processed by the optional image analysis module 760. As described with regard to methods 400, 500, 600 above, a processor of the sending device 200, receiving device 201, or network server 111 may analyze the buffered input audio (e.g., blocks 424, 554, 654, respectively). Accordingly, the receiving device 201 or the network server 111 may also include an input audio analysis module 700 or optional image analysis module. However, the receiving device 201 and network server 111, respectively, would analyze the input audio stream or image data collected from the sending device 200.

An input audio analysis module 700 may be used for recognizing muted speech as being improperly muted speech. For example, using the language identification module 732, if a primary language may be associated with the active voice call, and after a brief period of using a foreign language, the input audio analysis module 700 may detect the use of the primary language again. In this way, identification by the speech recognition module 730 of the use of the primary language may a predetermined condition for turning off the mute function using the smart mute feature. The processor of the sending device 200, receiving an indication that such a predetermined condition exists, may turn off the mute function using the smart mute feature.

Identification of the use of particular key words (listed in the key word module 734) or particular voices (identified through voice recognition module 736) may be a predetermined condition trigger the smart mute feature in addition to turning off the mute function. The key word module 734 may operate in conjunction with the speech-to-text module 738. The speech-to-text module 738 may decode and interpret the conversations/voice samples from all participants in real time. Identified high frequency words may be added to the key word module 734 list.

Additionally, it may be possible to identify different speakers (i.e., participants to the voice call) using the voice recognition module 736 (i.e., voice analysis) or by using the speaker's caller ID. In this way, the playback may be limited to select speakers. Also, a user may be provided an option to tag different speakers with different replay speeds (this option may mitigate the fact that some people are easier to understand than others, particularly when their speech is sped up). The tagging and associated replay speeds may be recorded in the user's preferences profile and reused on subsequent calls automatically without user intervention. Further, the language identification, key words, or voice recognition may be used by a processor of the sending device 200 in order to determine when not to use the smart mute feature.

Additionally, a training module 740 may receive the identified patterns or features from the feature extraction module 720 and well as information from the speech recognition module 730. The training module 740 may include a labeling module 744 and a classification functions module 742 for informing the training module 740 about the distinct key words that need to be acted upon. The training module 740 may use a machine-learning algorithm or a supervised learning model. An output of the training module 740 may be a set of decision functions that may be used to classify either real or test data into distinct commands or functions associated with the smart mute features. In addition, the training module 740 may inform a context analysis module 750, which may identify elements associated with the muted speech and the non-muted speech (either before or after turning on the mute function). Further still, the training module 740 may keep track of conditions associated with prior instances of either the mute function improperly being turned on or otherwise. In this way, the training module 740 may recognize when certain conversations should or should not be muted. The context analysis module 750 may compile words that are specifically associated or not associated with the active voice call. In addition, the compilation of words in the context analysis module 750 come from an earlier part of the current voice call or from prior voice call (particularly those with the same parties).

Images captured by the image sensor 1024 may be analyzed by the optional image analysis module 760 in order to detect and/or identify whether a user of the sending device is speaking toward the sending device or away from the sending device. Such visual clues may assist in determining whether the smart mute feature should be used. Similar to the audio analysis, the optional image analysis module 760 may include a feature extraction module 762, an expression classifier module 764, and a labeling module 766. The analysis using these modules 762, 764, 766 may use the intensity of pixels in a captured image, applying suitable spatial filtering to smooth-out noise, in order to detect anatomical features. The analysis may extract features identified from the image, such as a particular curve or profile in the image associated with angles of a user's head. Also, a template image may be used from a calibration step prior to operation. Captured images may then be compared to the template image as part of an analysis. For example, using a least-squares or similar methods a curve describing the shape of an anatomical feature, such as a chin, nose, eyes or ears, may be matched to similar curves derived from a template image of that user stored in memory.

FIGS. 8A-F illustrate two-dimensional field of view images from the perspective of the image sensor 1024 of the sending communication device. FIGS. 8A-8F include a user 10 that may be considered the muting party of an active voice call with the mute function on. The shape, position, and orientation of the user's head 9, and the position and orientation of the eyes 8 and mouth 12, 13 may indicate whether the user 10 is looking at the communication device. Speaking while looking toward the communication device may be considered a sign the user does not intent for the mute function to be active. Similarly, speaking while looking away from the communication device may be considered a sign the user intend for the mute function to be active.

Figure 8A:
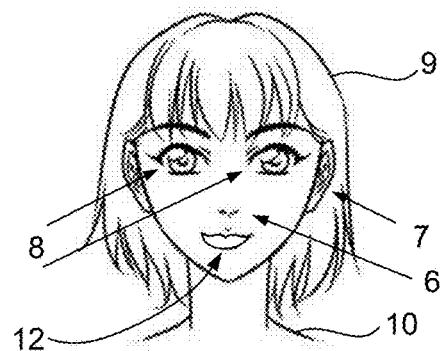
FIGS. 8A-8F are images from an image sensor that may be analyzed by a communication device in accordance with various embodiments.

FIG. 8A shows the user 10 facing directly at the image sensor. This may be detected from the position of the user's nose 6, ears 7, eyes 8, mouth 12, or other anatomical features relative to the user's head 9. In addition, the user 10 has her mouth 12 open, which is a sign her voice may be the one detected by the voice analysis module (e.g., 700).

Figure 8B:
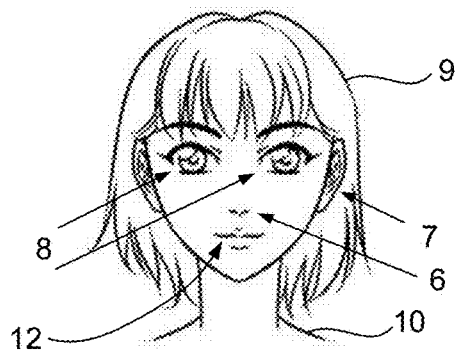

FIG. 8B is similar to FIG. 8A, except the user's mouth 12 is closed. A closed mouth 12 may be a sign the user's voice may not be the voice detected by the voice analysis module. An indication that another person is speaking in the background may be an indication the mute function is properly on.

Figure 8C:
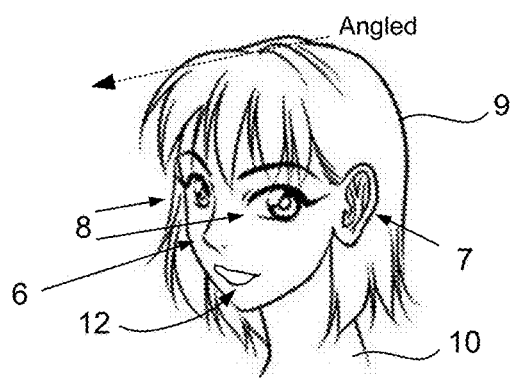

FIG. 8C shows the user 10 facing slightly away from the image sensor (i.e., angled). Again, this orientation may be detected from the position of the user's nose 6, ears 7, eyes 8, mouth 12, or other anatomical features relative to the user's head 9. In this image, the user 10 has her mouth 12 open, which is a sign her voice may be the one detected by the voice analysis module (e.g., 700). Facing away from the image sensor may be considered an indication the user is not speaking to the communication device. However, in this image the user 10 is only slightly facing away, which may be an inconclusive indication.

Figure 8D:
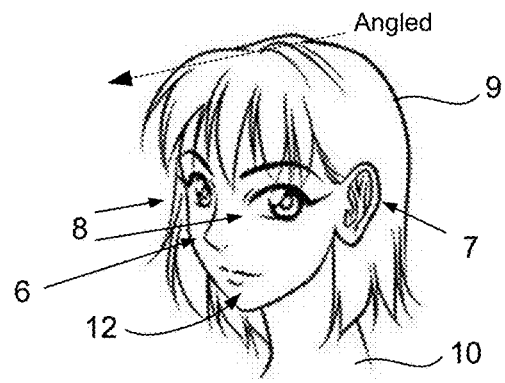

FIG. 8D is similar to FIG. 8C in that the user 10 is angled away from the image sensor. In this image, the user's mouth 12 is closed, which is a sign her voice may not be the voice detected by the voice analysis module. An indication that another person is speaking in the background may be an indication the mute function is properly on. Thus, even though the slightly facing away orientation of the user's head 9 was an inconclusive indication, the identification of a third party voice may be more conclusive that the mute function is properly activated.

Figure 8E:
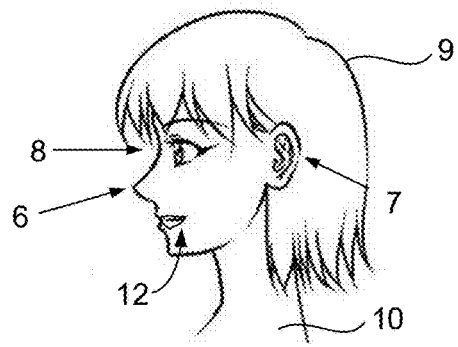

FIG. 8E shows the user 10 facing completely sideways, so only a profile is visible. Features such as the nose 6 and only one visible eye 8 are telltale signs of a profile image. The user 10 facing completely away from the image sensor may be considered a stronger indication the mute function is properly activated. In this image, the user 10 has her mouth open, which may suggest any detected voice is that of the user 10.

Figure 8F:
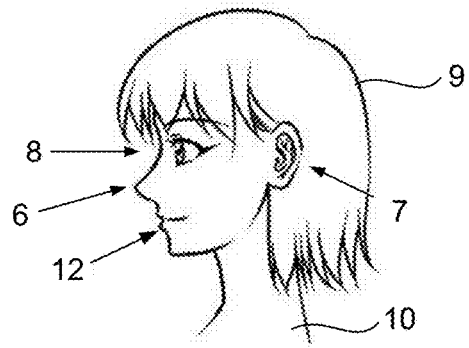

FIG. 8F is similar to FIG. 8E, except for the user's mouth 12 being closed. Once again, the user 10 facing completely away from the image sensor may be considered a stronger indication the mute function is properly activated. In addition, an indication that another person is speaking in the background may be another indication the mute function is properly on.

Figure 9:
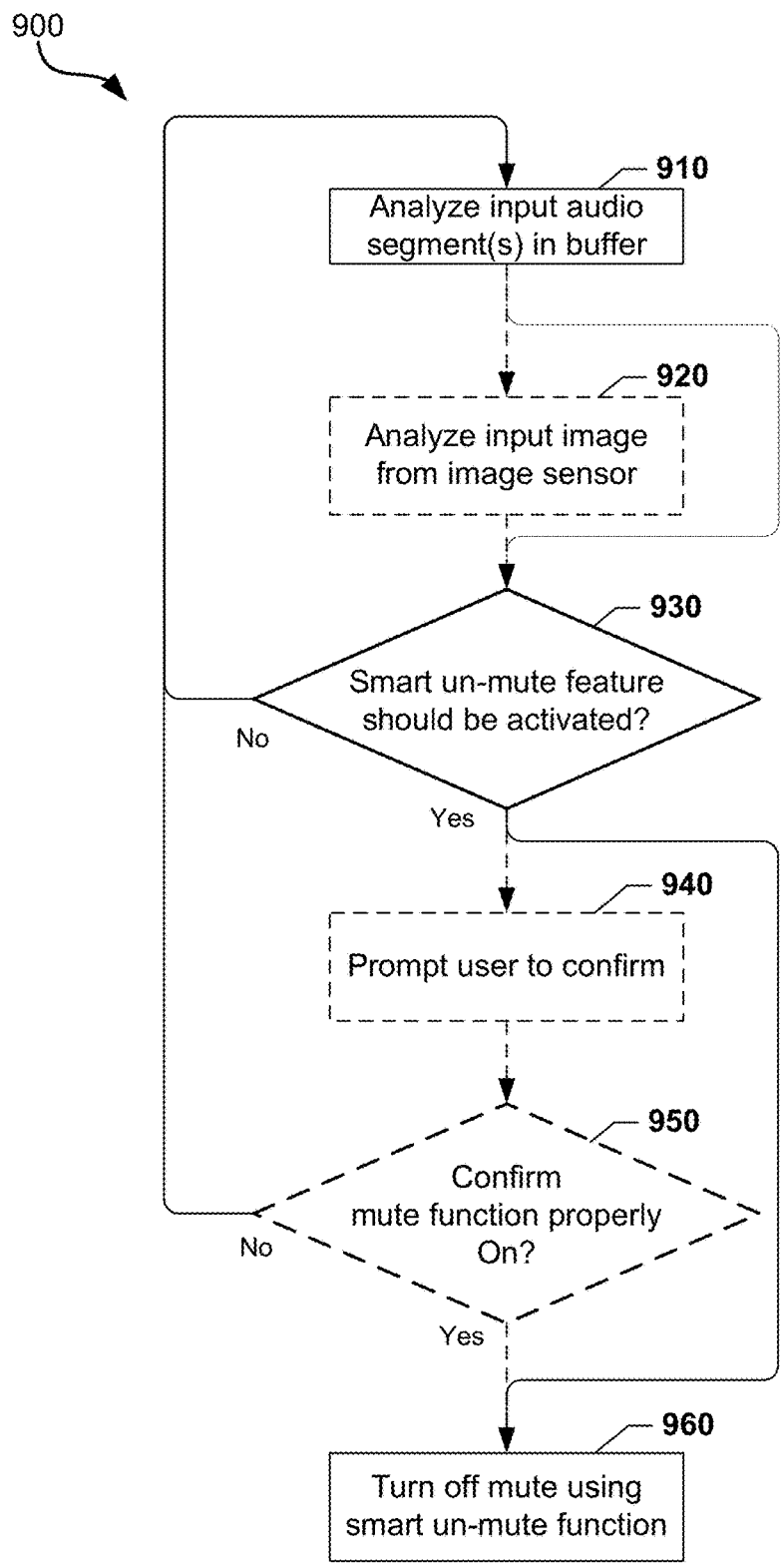
FIG. 9 is a process flow diagram illustrating an embodiment method of controlling voice call audio transmissions.

FIG. 9 illustrates an embodiment method 900 of controlling voice call audio transmissions from a communication device during an active voice call, in accordance with various embodiments. In particular, method 900 includes some additional analysis steps of the input audio segment(s) and/or an input image. In response to the method 900 concluding with turning off the mute function using the smart mute feature (i.e., block 960), the processor may further control voice call audio transmissions in accordance with any one of methods 400, 500, 600 above.

In block 910, the processor of the communication device may analyze one or more input audio segments in the buffer. This analysis may involve using the input audio analysis module (e.g., 700), including one or more sub-modules therein. The analysis may identify one or more predetermined conditions that suggest a certain degree of likelihood that the mute function is not properly on, which means the smart un-mute function should be activated. Such predetermined conditions may include, but are not limited to, an association with at least one of a key word, a language, a context of the active voice call, and a recognized voice.

Optionally in block 920, the processor of the communication device may analyze one or more images from an image sensor (e.g., 760). A single image, a series of images, or a video image may be analyzed in order to determine whether the mute function is properly on. In addition, the analysis of the input image in block 920 may be correlated to the audio input analysis in block 910, in order to identify one or more predetermined conditions that suggest a certain degree of likelihood that the mute function is not properly on, which means the smart un-mute function should be activated. In this way, a sensor input from an image sensor of the communication device may be used for determining whether the one or more predetermined conditions exist.

In determination block 930, the processor of the communication device may determine whether the smart un-mute function should be activated based on the audio input analysis in block 910 and the further optional analysis of the input image in block 920. In response to determining the smart un-mute function should not be activated (i.e., determination block 930="No"), the process may return to block 910 for further input audio analysis.

In response to determining the smart un-mute function should be activated (i.e., determination block 930="Yes"), the processor may either proceed directly to block 960 to turn the smart un-mute function of the smart mute feature on or optionally prompt the user to confirm that the smart un-mute function should be activated in block 940. If the user confirmation option is used in block 940 the processor of the communication device may determine whether the user confirmed that the smart un-mute function should be activated in determination block 950.

In response to a user input indicating the smart un-mute function should not be activated (i.e., determination block 950="No"), the processor may return to block 910 for further analyze the input audio. In response to the user input indicating the smart un-mute function should be activated (i.e., determination block 950="Yes"), the processor may activate the smart un-mute function in block 960.

Figure 10:
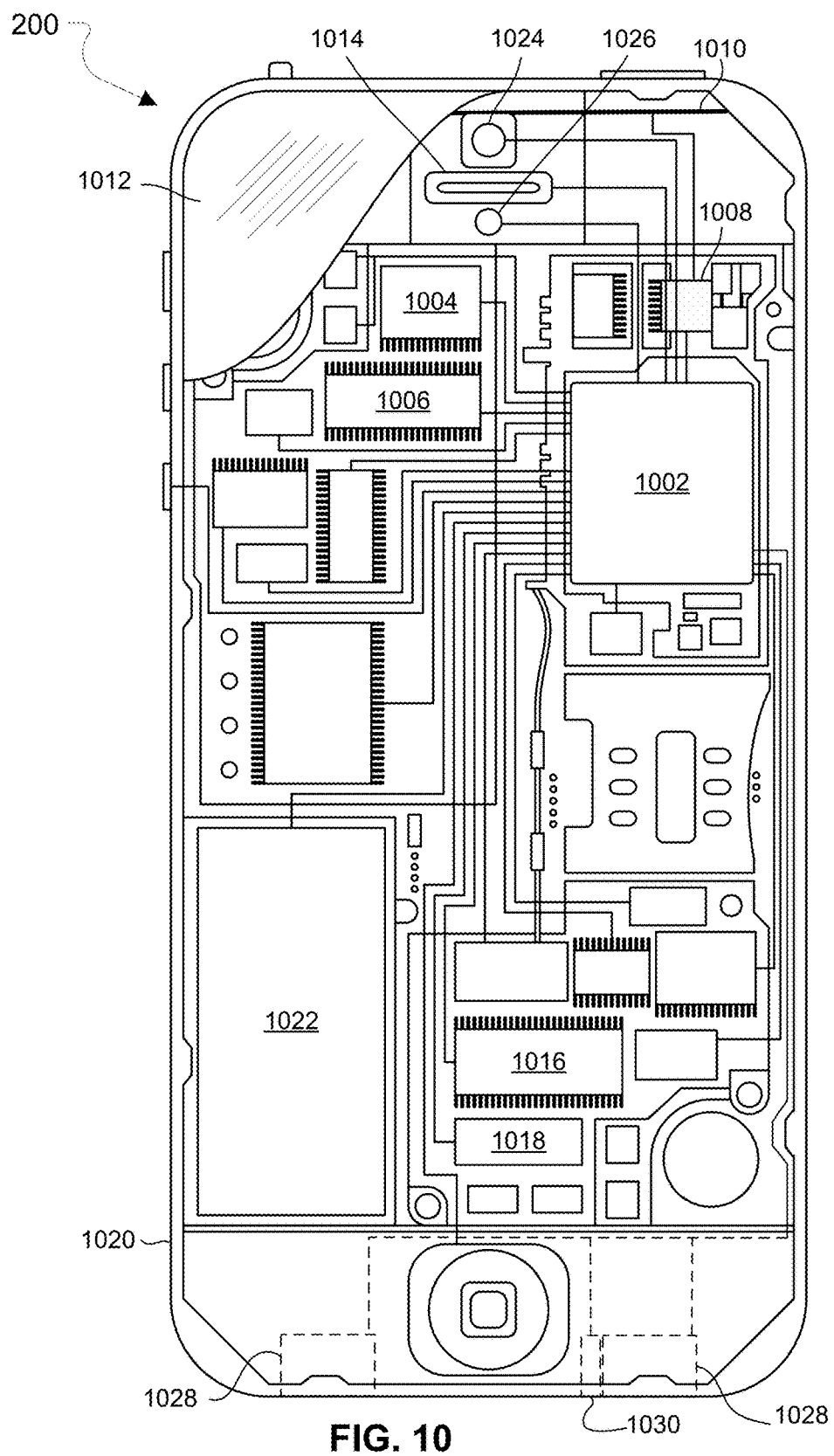
FIG. 10 is a component block diagram illustrating an example communication device suitable for use with various embodiments.

Various embodiments may be implemented in any of a variety of communication devices 200, an example of which is illustrated in FIG. 10. For example, a communication device 200 may include a processor 1002 coupled to a touch screen controller 1004 and an internal memory 1006. The processor 1002 may be one or more multi-core ICs designated for general or specific processing tasks. The internal memory 1006 may be volatile or non-volatile memory, and may also be secure and/or encrypted memory, or unsecure and/or unencrypted memory, or any combination thereof.

The touch screen controller 1004 and the processor 1002 may also be coupled to a touch screen panel 1012, such as a resistive-sensing touch screen, capacitive-sensing touch screen, infrared sensing touch screen, etc. The communication device 200 may have one or more radio signal transceivers 1008 (e.g., Peanut®, Bluetooth®, Zigbee®, Wi-Fi, RF radio) and antennae 1010, for sending and receiving, coupled to each other and/or to the processor 1002. The radio signal transceivers 1008 and antennae 1010 may be used with the above-mentioned circuitry to implement the various wireless transmission protocol stacks and interfaces. The communication device 200 may include a cellular network wireless modem chip 1016 that enables communication via a cellular network and is coupled to the processor. The communication device 200 may include a peripheral device connection interface 1018 coupled to the processor 1002. The peripheral device connection interface 1018 may be singularly configured to accept one type of connection, or multiply configured to accept various types of physical and communication connections, common or proprietary, such as USB, FireWire, Thunderbolt, or PCIe. The peripheral device connection interface 1018 may also be coupled to a similarly configured peripheral device connection port (not shown). The communication device 200 may also include one or more speakers 1028 for outputting audio and one or more microphones 1030 for receiving audio inputs. The communication device 200 may also include a housing 1020, constructed of a plastic, metal, or a combination of materials, for containing all or some of the components discussed herein. The communication device 200 may include a power source 1022 coupled to the processor 1002, such as a disposable or rechargeable battery. In addition, the communication device 200 may include additional sensors, such as a motion sensor 1014, a forward facing image sensor 1024, and a rearward facing image sensor 1026, coupled to the processor 1002 for providing sensor input.

Figure 11:
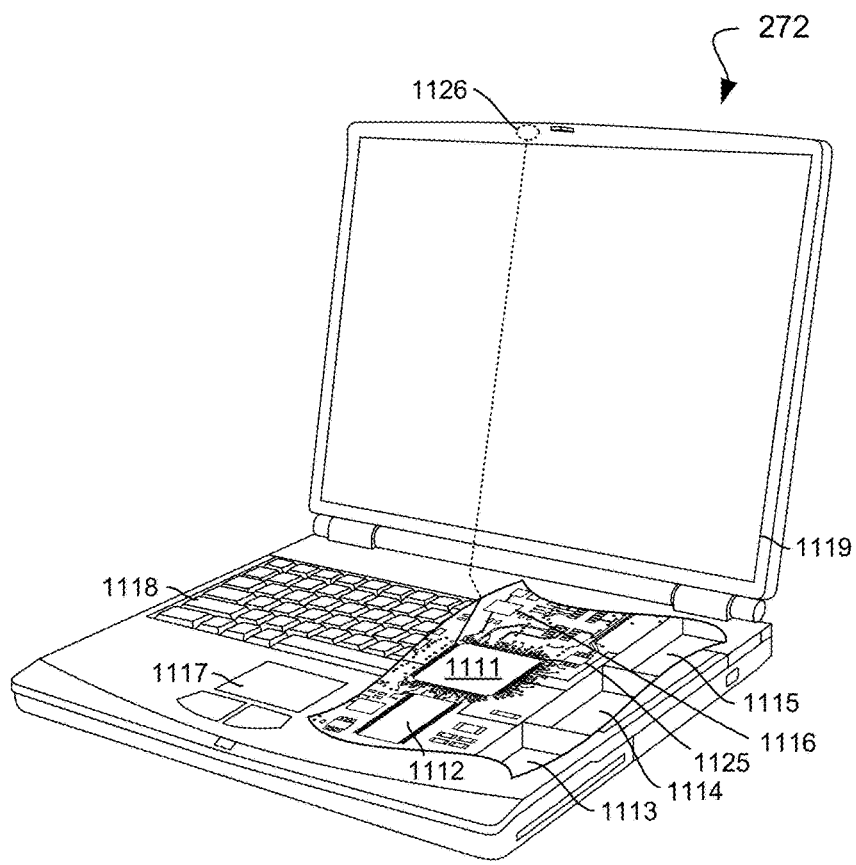
FIG. 11 is a component block diagram illustrating another example communication device suitable for use with various embodiments.

Various embodiments may also be implemented within a variety of personal computing devices (communication devices 200), such as a laptop computer 272 as illustrated in FIG. 11. Many laptop computers include a touch pad touch surface 1117 that serves as the computer's pointing device, and thus may receive drag, scroll, and flick gestures similar to those implemented on wireless computing devices equipped with a touch screen display and described. The laptop computer 272 will typically include a processor 1111 coupled to volatile memory 1112 and a large capacity nonvolatile memory, such as a disk drive 1113 of flash memory. The laptop computer 272 may also include a floppy disc drive 1114 and a compact disc (CD) drive 1115 coupled to the processor 1111. The laptop computer 272 may also include a number of connector ports coupled to the processor 1111 for establishing data connections or receiving external memory devices, such as a USB or FireWire® connector sockets, or other network connection circuits for coupling the processor 1111 to a network. In a notebook configuration, the computer housing includes a microphone 1116, the touch pad touch surface 1117, a keyboard 1118, a display 1119, speakers 1125, and an image sensor 1126 all coupled to the processor 1111. Other configurations of the computing device may include a computer mouse or trackball coupled to the processor (e.g., via a USB input) as are well known, which may also be use in conjunction with various embodiments.

Figure 12:
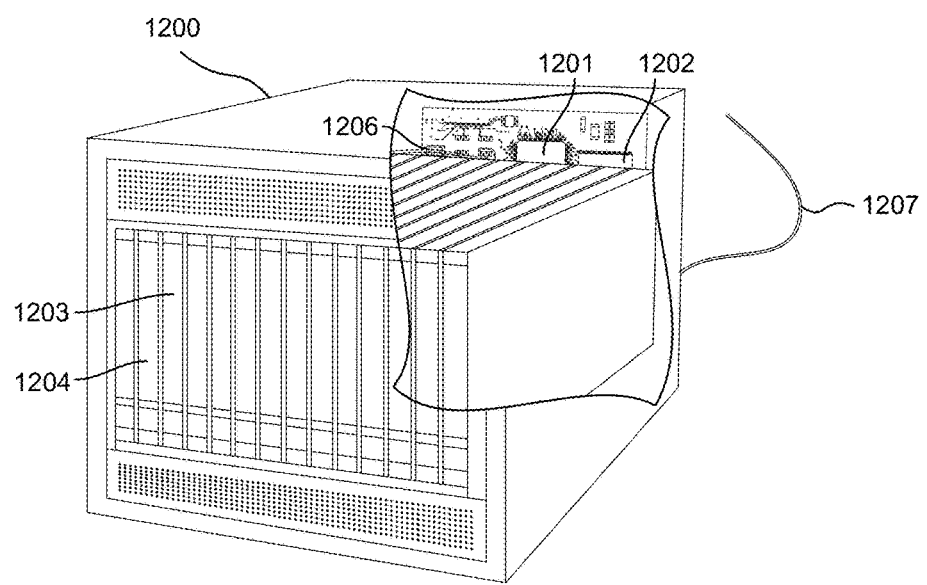
FIG. 12 is a component block diagram illustrating an example network server suitable for use with various embodiments.

The various embodiments may be implemented on any of a variety of commercially available server devices, such as the server 1200 illustrated in FIG. 12. Such a server 1200 typically includes a processor 1201 coupled to volatile memory 1202 and a large capacity nonvolatile memory, such as a disk drive 1203, 1204. The server 1200 may also include a disk drive 1203, 1204, such as a floppy disc drive, compact disc (CD) or DVD disc drive, coupled to the processor 1201. The server 1200 may be configured with server-executable instructions to perform operations of the embodiment methods described above, and such server-executable instructions may be stored on the disk drive(s) 1203, 1204 and executed by the processor 1201. The server 1200 may also include network access ports 1206 and wired connections 1207 coupled to the processor 1201 for establishing data connections with a network (e.g., 110), such as a local area network. In this way, the server 1200 may be coupled to other broadcast system computers and servers, the Internet, the PSTN, and/or a cellular data network (e.g., CDMA, TDMA, GSM, PCS, 3G, 4G, LTE, or any other type of cellular data network).

The processors 1002, 1111, and 1201 may be any programmable microprocessor, microcomputer or multiple processor chip or chips that can be configured by software instructions (applications) to perform a variety of functions, including the functions of various embodiments as described. In some devices, multiple processors may be provided, such as one processor dedicated to wireless communication functions and one processor dedicated to running other applications. Typically, software applications may be stored in the internal memory 1006, 1112, 1113, and 1202 before they the software applications are accessed and loaded into the processors 1002, 1111, and 1201. The processors 1002, 1111, and 1201 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 1002, 1111, and 1201, including internal memory or removable memory plugged into the device and memory within the processor 1002, 1111, and 1201, themselves.

In one or more exemplary embodiments, the functions described may be implemented in hardware, software, firmware, or any combination thereof. If implemented in software, the functions may be stored as one or more instructions or code on a non-transitory computer readable storage medium or non-transitory processor-readable storage medium. The steps of a method or algorithm may be embodied in a processor-executable software module which may reside on a non-transitory computer readable or processor-readable storage medium. Non-transitory computer readable or processor-readable storage media may be any storage media that may be accessed by a computer or a processor. By way of example but not limitation, such non-transitory computer readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer readable and processor-readable media. Additionally, the operations of a method or algorithm may reside as one or any combination or set of codes and/or instructions on a non-transitory processor-readable medium and/or computer readable medium, which may be incorporated into a computer program product.

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order.

Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular. Additionally, as used herein and particularly in the claims, "comprising," has an open-ended meaning, such that one or more additional unspecified elements, steps and aspects may be further included and/or present.

The various illustrative logical blocks, modules, circuits, and process flow diagram blocks described in connection with the embodiments may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of controlling voice call audio transmissions from a sending communication device during an active voice call, comprising:

receiving an input audio segment with buffer instructions, at a receiving communication device remote from the sending communication device, in response to a mute function being turned on at the sending communication device, wherein the buffer instructions prevent the received input audio segment from being played back at the receiving communication device;

determining, by a processor in the receiving communication device, whether the received input audio segment should not have been muted;

transmitting, using the receiving communication device, to the sending communication device an inquiry message for activating a playback of at least one portion of the received input audio segment in response to determining that the received input audio segment should not have been muted;

receiving a smart un-mute activation message from the sending communication device; and activating the playing of the at least one portion of the received input audio segment in response to receiving the smart un-mute activation message.

2. The method of claim 1, further comprising:
storing the received input audio segment in a memory buffer of the receiving communication device.

3. The method of claim 1, further comprising:
analyzing the received input audio segment; and
generating a modified audio segment, wherein the playback of the at least one portion of the received input audio segment comprises outputting the modified audio segment.

4. The method of claim 3, wherein generating the modified audio segment comprises at least one of removing periods of silence and speeding up the input audio segment while maintaining an original pitch of the input audio segment.

5. The method of claim 1, further comprising:
analyzing the received input audio segment; and
determining based on the analysis of the received input audio segment whether a predetermined audio condition exists.

6. The method of claim 5, wherein the predetermined audio condition includes an association with at least one of a key word, a language, a context of the active voice call, a recognized voice, and a sensor input of the sending communication device.

7. The method of claim 1, further comprising receiving a further input audio stream at the receiving communication device while at least one portion of the received input audio segment is played back.

8. The method of claim 7, further comprising outputting a real-time input audio stream at the receiving communication device after playback of the received input audio segment is complete.

9. A receiving communication device, comprising:
a memory buffer; and
a processor coupled to the memory buffer, wherein the processor is configured with processor-executable instructions to perform operations comprising:
receiving an input audio segment with buffer instructions during an active voice call, from a sending communication device remote from the receiving communication device, in response to a mute function being turned on at the sending communication device, wherein the buffer instructions prevent the received input audio segment from being played back at the receiving communication device;
determining whether the received input audio segment should not have been muted;
transmitting to the sending communication device an inquiry message for activating a playback of at least one portion of the received input audio segment in response to determining that the received input audio segment should not have been muted;
receiving a smart un-mute activation message from the sending communication device; and activating the playing of the at least one portion of the received input audio segment in response to receiving the smart un-mute activation message.

10. The receiving communication device of claim 9, wherein the processor is configured with processor-executable instructions to perform operations further comprising: storing the received input audio segment in the memory buffer.

11. The receiving communication device of claim 9, wherein the processor is configured with processor-executable instructions to perform operations further comprising:
analyzing the received input audio; and
generating a modified audio segment,
wherein the processor is configured with processor-executable instructions to perform operations such that the playback of the at least one portion of the received input audio segment comprises outputting the modified audio segment.

12. The receiving communication device of claim 11, wherein the processor is configured with processor-executable instructions to perform operations such that generating the modified audio segment comprises at least one of removing periods of silence and speeding up the input audio segment while maintaining an original pitch of the input audio segment.

13. The receiving communication device of claim 9, wherein the processor is configured with processor-executable instructions to perform operations further comprising:
analyzing the received input audio segment; and
determining based on the analysis of the received input audio segment whether a predetermined audio condition exists.

14. The receiving communication device of claim 13, wherein the processor is configured with processor-executable instructions to perform operations such that the predetermined audio condition includes an association with at least one of a key word, a language, a context of the active voice call, a recognized voice, and a sensor input of the sending communication device.

15. The receiving communication device of claim 9, wherein the processor is configured with processor-executable instructions to perform operations further comprising receiving a further input audio stream at the memory buffer while at least one portion of the received input audio segment is played back.

16. The receiving communication device of claim 15, wherein the processor is configured with processor-executable instructions to perform operations further comprising transmitting a real-time input audio stream after playback of audio data in the memory buffer is complete.

17. A receiving communication device, comprising:
means for receiving an input audio segment with buffer instructions, from a sending communication device, in response to a mute function being turned on at the sending communication device, wherein the buffer instructions prevent the received input audio segment from being played back at the receiving communication device;
means for determining, at the receiving communication device, whether the received input audio segment should not have been muted;
means for transmitting, using the receiving communication device, to the sending communication device an inquiry message for activating a playback of at least one portion of the received input audio segment in response to determining that the received input audio segment should not have been muted;
means for receiving a smart un-mute activation message from the sending communication device; and
means for activating the playing of the at least one portion of the received input audio segment in response to receiving the smart un-mute activation message.

18. A non-transitory processor-readable storage medium having stored thereon processor-executable instructions configured to cause a processor of a receiving communication device to perform operations comprising:
receiving an input audio segment with buffer instructions during an active voice call, at the receiving communication device remote from a sending communication device, in response to a mute function being turned on at the sending communication device, wherein the buffer instructions prevent the received input audio segment from being played back at the receiving communication device;
determining whether the received input audio segment should not have been muted;
transmitting to the sending communication device an inquiry message for activating a playback of at least one portion of the received input audio segment in response to determining that the received input audio segment should not have been muted;
receiving a smart un-mute activation message from the sending communication device; and
activating the playing of the at least one portion of the received input audio segment in response to receiving the smart un-mute activation message.

19. The non-transitory processor-readable storage medium of claim 18, wherein the stored processor-executable instructions are configured to cause the processor to perform operations further comprising:
storing the received input audio segment in a memory buffer of the receiving communication device.

20. The non-transitory processor-readable storage medium of claim 18, wherein the stored processor-executable instructions are configured to cause the processor to perform operations further comprising:
analyzing the received input audio segment; and
generating a modified audio segment,
wherein the stored processor-executable instructions are configured to cause the processor to perform operations such that the playback of the at least one portion of the received input audio segment comprises playing back the modified audio segment.

21. The non-transitory processor-readable storage medium of claim 20, wherein the stored processor-executable instructions are configured to cause the processor to perform operations such that generating the modified audio segment comprises at least one of removing periods of silence and speeding up the input audio segment while maintaining an original pitch of the input audio segment.

22. The non-transitory processor-readable storage medium of claim 18, wherein the stored processor-executable instructions are configured to cause the processor to perform operations further comprising:
analyzing the received input audio segment; and
determining based on the analysis of the received input audio segment whether a predetermined audio condition exists.

23. The non-transitory processor-readable storage medium of claim 22, wherein the stored processor-executable instructions are configured to cause the processor to perform operations such that the predetermined audio condition includes an association with at least one of a key word, a language, a context of the active voice call, a recognized voice, and a sensor input of the sending communication device.

24. The non-transitory processor-readable storage medium of claim 18, wherein the stored processor-executable instructions are configured to cause the processor to perform operations further comprising receiving a further input audio stream at the receiving communication device while at least one portion of the received input audio segment is played back.

25. The non-transitory processor-readable storage medium of claim 24, wherein the stored processor-executable instructions are configured to cause the processor to perform operations further comprising outputting a real-time input audio stream at the receiving communication device after playback of the received input audio segment is complete.

* * * * *